United States Patent
Wennersten et al.

(10) Patent No.: US 10,863,189 B2
(45) Date of Patent: Dec. 8, 2020

(54) MOTION VECTOR RECONSTRUCTION ORDER SWAP

(71) Applicant: Telefonaktiebolaget LM Ericsson (publ), Stockholm (SE)

(72) Inventors: Per Wennersten, Årsta (SE); Martin Pettersson, Vallentuna (SE); Ruoyang Yu, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 24 days.

(21) Appl. No.: 16/085,843

(22) PCT Filed: Mar. 10, 2017

(86) PCT No.: PCT/SE2017/050235
§ 371 (c)(1),
(2) Date: Sep. 17, 2018

(87) PCT Pub. No.: WO2017/160209
PCT Pub. Date: Sep. 21, 2017

(65) Prior Publication Data
US 2019/0098331 A1    Mar. 28, 2019

Related U.S. Application Data

(60) Provisional application No. 62/310,010, filed on Mar. 18, 2016.

(51) Int. Cl.
*H04N 19/70*    (2014.01)
*H04N 19/513*    (2014.01)
(Continued)

(52) U.S. Cl.
CPC ......... *H04N 19/513* (2014.11); *H04N 19/159* (2014.11); *H04N 19/184* (2014.11);
(Continued)

(58) Field of Classification Search
CPC .................................................... H04N 19/513
(Continued)

(56) References Cited

U.S. PATENT DOCUMENTS

2012/0008688 A1    1/2012  Tsai et al.
2012/0230392 A1*   9/2012  Zheng .................. H04N 19/197
                                          375/240.02
(Continued)

OTHER PUBLICATIONS

International Search Report and Written Opinion issued in International Application No. PCT/EP2017/050235, dated Jun. 26, 2017, 12 pages.
(Continued)

*Primary Examiner* — Amir Shahnami
(74) *Attorney, Agent, or Firm* — Patent Portfolio Builders, PLLC

(57) ABSTRACT

Motion vectors used for bi-prediction of a block of a current picture are predicted and reconstructed by determining candidate motion vector predictors for each of two motion vector predictor lists. A reconstruction order for the motion vector predictor lists is selected based on the candidate motion vector predictors. In video coding, motion vector deltas are generated for the motion vector predictor lists according to the selected reconstruction order and in video decoding, reconstructed motion vectors are generated for the motion vector predictor lists according to the selected reconstruction order. A candidate motion vector predictor of the second motion vector predictor list is replaced by the actual or reconstructed motion vector for the first motion vector predictor list or a scaled version thereof. This selection of reconstruction order enables determining better candidate motion vector predictors and thereby resulting in smaller motion vector deltas.

20 Claims, 18 Drawing Sheets

(51) Int. Cl.
*H04N 19/577* (2014.01)
*H04N 19/52* (2014.01)
*H04N 19/159* (2014.01)
*H04N 19/184* (2014.01)

(52) U.S. Cl.
CPC ........... *H04N 19/52* (2014.11); *H04N 19/577* (2014.11); *H04N 19/70* (2014.11)

(58) Field of Classification Search
USPC .................................................... 375/240.16
See application file for complete search history.

(56) References Cited

U.S. PATENT DOCUMENTS

| | | |
|---|---|---|
| 2013/0003851 A1 | 1/2013 | Yu et al. |
| 2013/0128983 A1 | 5/2013 | Sugio et al. |
| 2014/0192884 A1* | 7/2014 | Laroche ............... H04N 19/105 375/240.16 |
| 2014/0211851 A1 | 7/2014 | Miyoshi |

OTHER PUBLICATIONS

Zheng, Y. et al., "Extended Motion Vector Prediction for Bi predictive Mode", 5th JCT-VC meeting; 96. MPEG meeting; Mar. 16-23, 2011, Geneva (4 pages).

Samuelsson, J. et al., "Motion vector coding optimizations", 3rd JVET meeting; May 26-Jun. 1, 2016, Geneva (5 pages).

European Search Report issued in corresponding Application No. 17767064.3 dated Jan. 7, 2019; 10 Pages. The reference not cited therein has been previously made of record.

Jian-Liang Lin et al: "Motion Vector Coding in the HEVC Standard", IEEE Journal of Selected Topics in Signal Processing, vol. 7, No. 6, Dec. 1, 2013, pp. 957-968.

Lin Y et al: "Simplification on spatial AMVP candidate derivation", 101. MPEG Meeting; Jul. 16, 2012-Jul. 20, 2012; Stockholm; (Motion Picture Expert Group or ISO/IEC JTC1/SC29/WG11), No. m25468, Jul. 12, 2012.

\* cited by examiner

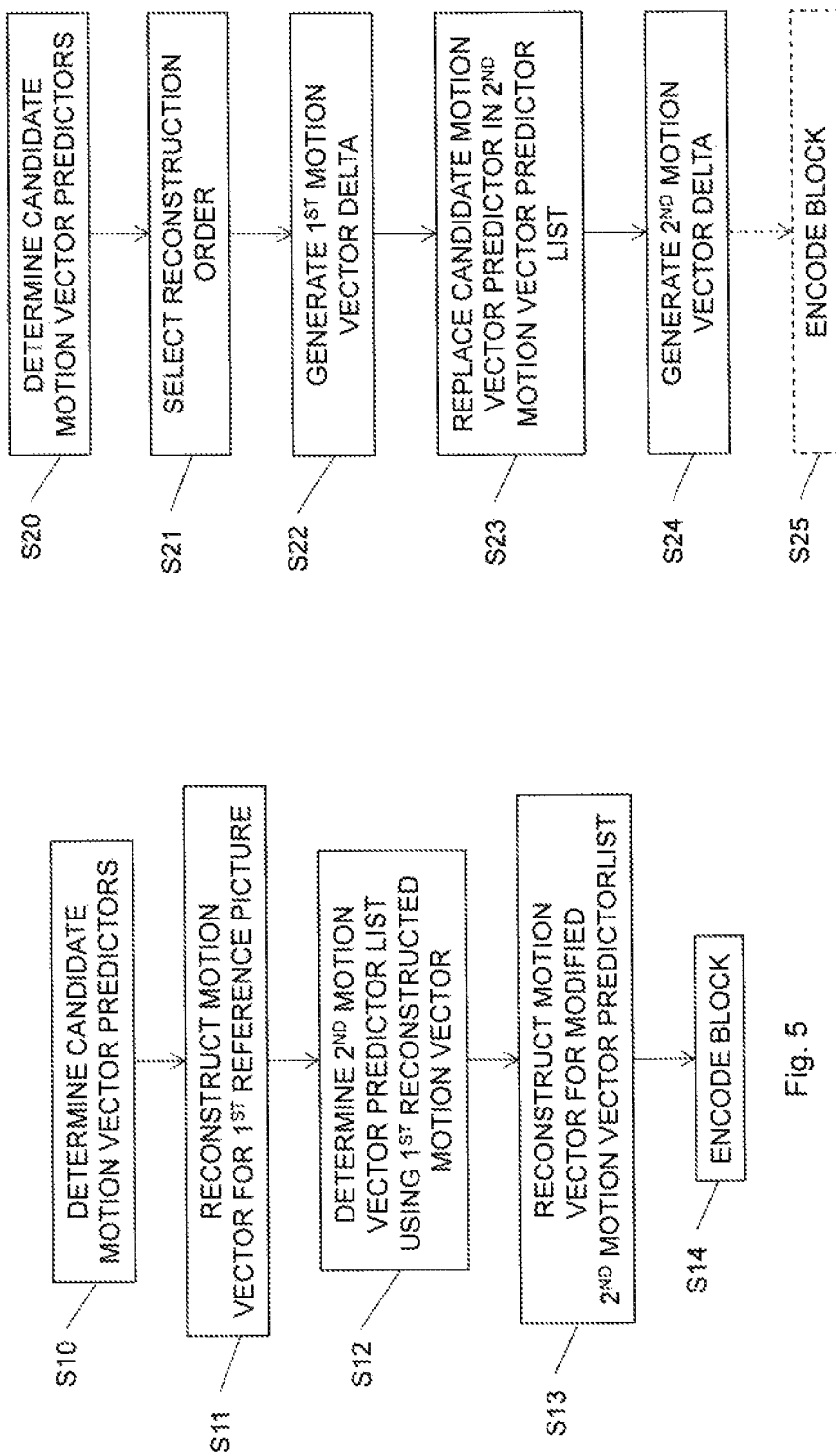

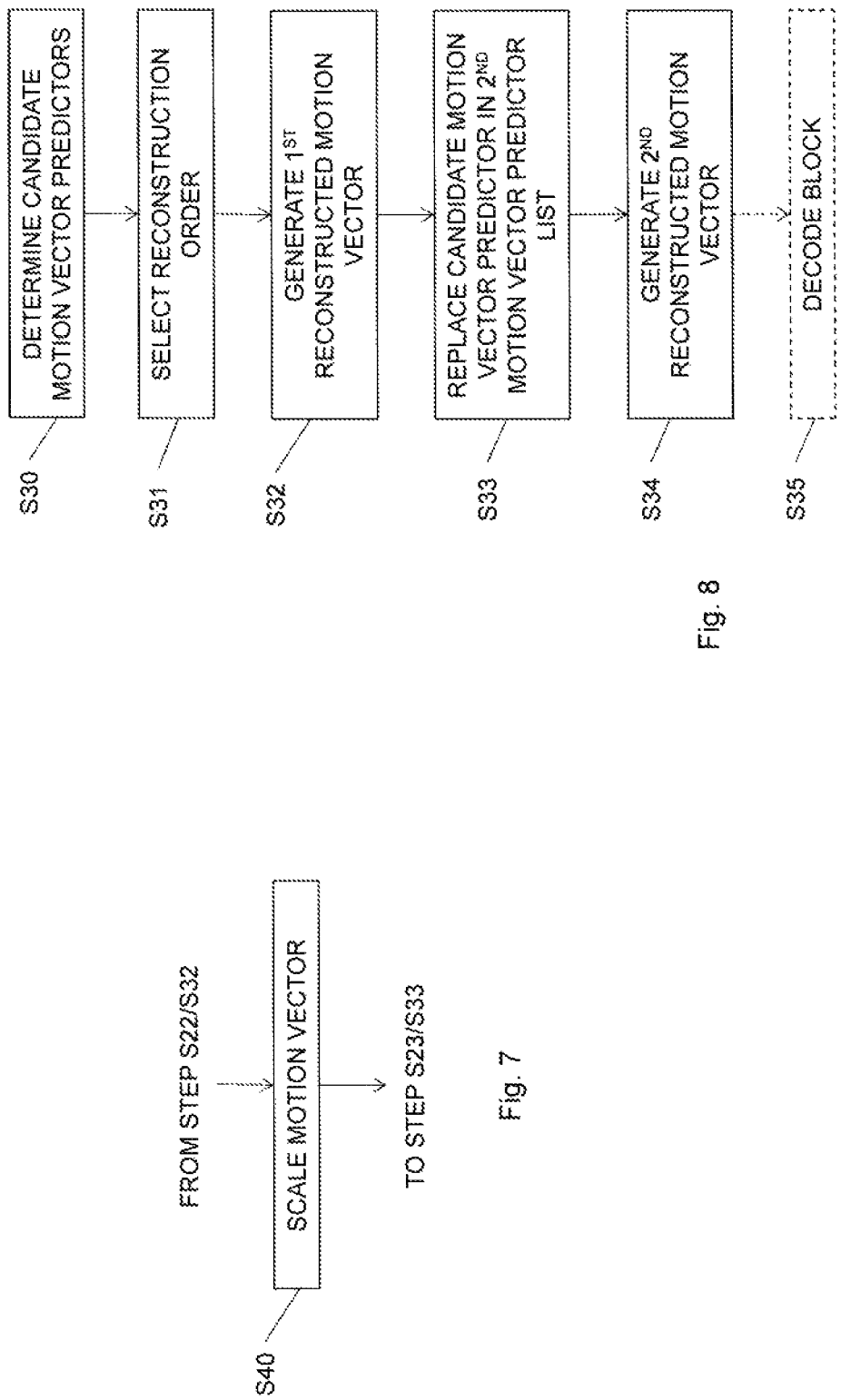

Fig. 12   MV predictor + MV delta = MV

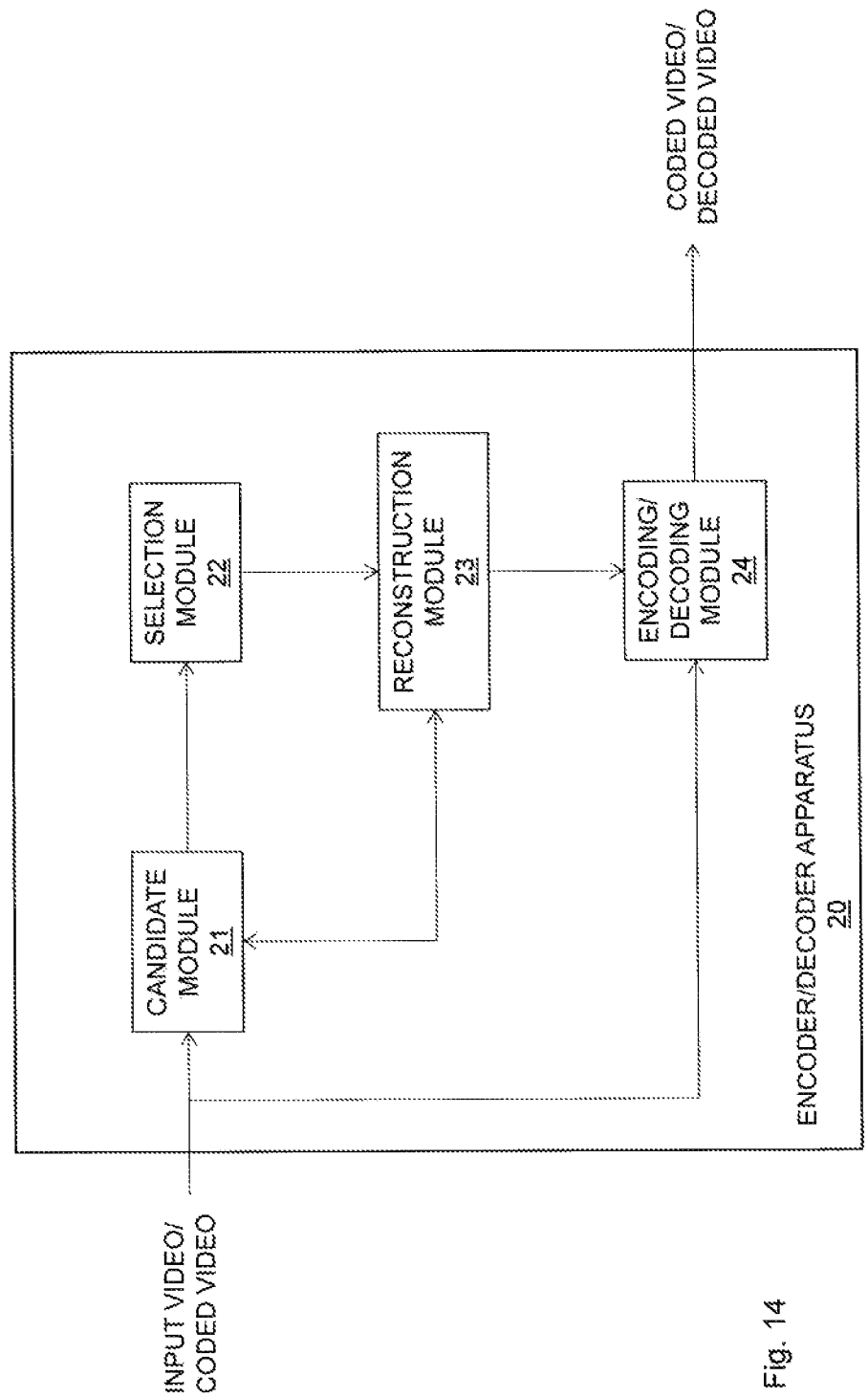

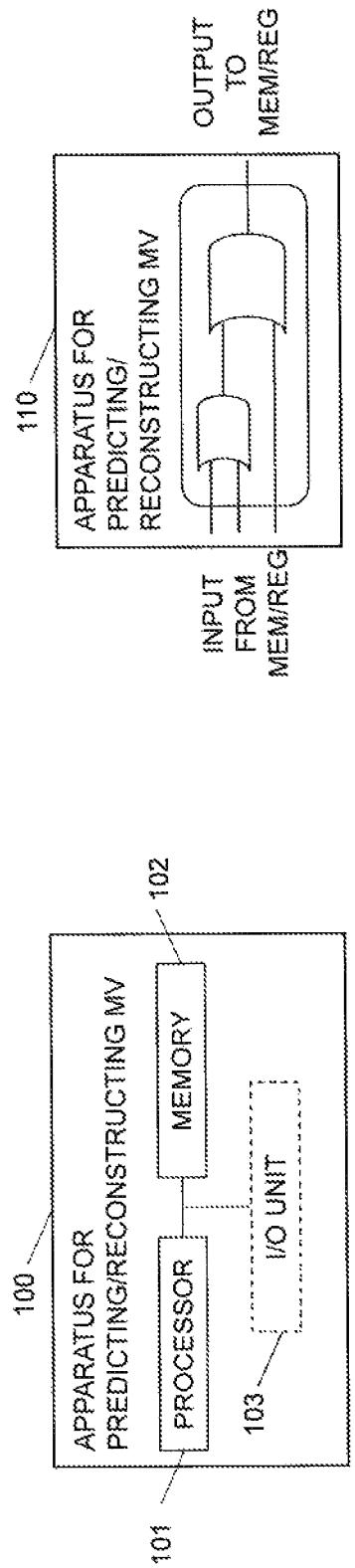

MOTION VECTOR RECONSTRUCTION ORDER SWAP

CROSS REFERENCE TO RELATED APPLICATION(S)

This application is a 35 U.S.C. § 371 National Stage of International Patent Application No. PCT/SE2017/050235, filed Mar. 10, 2017, designating the United States and claiming priority to U.S. provisional application No. 62/310,010, filed on Mar. 18, 2016. The above identified applications are incorporated by reference.

TECHNICAL FIELD

The present embodiments generally relate to video encoding and video decoding, and in particular to predicting and reconstructing motion vectors in connection with video encoding and video decoding.

BACKGROUND

High Efficiency Video Coding (HEVC), also referred to as H.265, is a block based video codec standardized by the Telecommunication Standardization Sector of the International Telecommunications Union (ITU-T) and the Moving Pictures Experts Group (MPEG) that utilizes both temporal and spatial prediction. Spatial prediction is achieved using intra (I) prediction from within the current picture. Temporal prediction is achieved using inter (P) or bi-directional inter (B) prediction on a block level from previously decoded reference pictures. The difference between the original pixel data and the predicted pixel data, referred to as the residual, is transformed into the frequency domain and quantized and entropy encoded (e.g., Context-Adaptive Variable Length Coding (CAVLC), Context-Adaptive Binary Arithmetic Coding (CABAC), etc.) before being transmitted together with necessary prediction parameters, e.g., mode selections and motion vectors, after entropy encoding them. By quantizing the transformed residuals, the tradeoff between bitrate and quality of the video may be controlled. The level of quantization is determined by the quantization parameter (QP). The decoder performs entropy decoding, inverse quantization, and inverse transformation to obtain the residual, and then adds the residual to an intra- or inter-prediction to reconstruct a picture.

When encoding video, the first picture will typically be encoded as a still image. Subsequent pictures will include references to previous pictures, along with motion vectors indicating the movement between the pictures. Motion vectors will typically be supplied for blocks of pixels, ranging from 4×4 to 64×64 pixels in size, and can constitute up to about 50% of the total bitrate of encoded video. Several techniques are used to reduce the size of the encoded motion vectors, to reduce costs, and/or to improve performance. Conventional techniques, however, do not always optimize performance. Thus, there remains a need for improved techniques regarding motion vectors used for video encoding and video decoding.

SUMMARY

It is a general objective to provide an improved motion vector prediction and reconstruction in connection video encoding and video decoding.

It is a particular objective to provide an improved motion vector prediction and reconstruction for bi-directional inter prediction.

These and other objectives are met by embodiments disclosed herein.

An aspect of the embodiments relates to a method for predicting motion vectors used for bi-prediction in video encoding of a block of a current picture in a video encoder. The method comprises determining at least one candidate motion vector predictor for each of two different motion vector predictor lists, each candidate motion vector predictor associated with a reference picture. The method also comprises selecting a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The method further comprises generating a first motion vector delta as a difference between a first actual motion vector for the block and a candidate motion vector predictor from the first motion vector predictor list. The method additionally comprises replacing one of the at least one candidate motion vector predictor in the second motion vector predictor list with the first actual motion vector or a scaled version of the first actual motion vector. The method also comprises generating a second motion vector delta as a difference between a second actual motion vector for the block and a candidate motion vector predictor from the second motion vector predictor list.

Another aspect of the embodiments relates to a method for reconstructing motion vectors used for bi-prediction in video decoding of a block of a current picture in a video decoder. The method comprises determining at least one candidate motion vector predictor for each of two different motion vector predictor lists, each candidate motion vector predictor associated with a reference picture. The method also comprises selecting a reconstruction order for two different motion vector predictor lists based on the candidate motion vector predictors or responsive to a syntax element retrieved from a bitstream representing an encoded version of the current picture. The reconstruction order identifies one of the two different motion vector predictor lists as a first motion vector predictor list and the other of the two different motion vector lists as a second motion vector predictor list. The method further comprises generating a first reconstructed motion vector for the first motion vector predictor list using a candidate motion vector predictor of the first motion vector predictor list and a first motion vector delta retrieved from the bitstream. The method additionally comprises replacing one of the at least one candidate motion vector predictor in the second motion vector predictor list with the first reconstructed motion vector or a scaled version of the first reconstructed motion vector. The method also comprises generating a second reconstructed motion vector for the second motion vector predictor list using a candidate motion vector predictor of the second motion vector predictor list and a second motion vector delta retrieved from the bitstream.

A further aspect of the embodiments relates to an apparatus for predicting motion vectors used for bi-prediction in video encoding of a block of a current picture in a video encoder. The apparatus is configured to determine at least one candidate motion vector predictor for each of two different motion vector predictor lists, each candidate motion vector predictor associated with a reference picture. The apparatus is also configured to select a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The apparatus is further configured to generate a first motion vector delta as a difference between a first actual motion vector for the block and a candidate motion vector predictor from the first motion vector predictor list. The apparatus is additionally configured to replace one of the at least one candidate motion vector predictor in the second motion vector predictor list with the first actual motion vector or a scaled version of the first actual motion vector. The apparatus is also configured to generate a second motion vector delta as a difference between a second actual motion vector for the block and a candidate motion vector predictor from the second motion vector predictor list.

Another aspect of the embodiments relates to an apparatus for reconstructing motion vectors used for bi-prediction in video decoding of a block of a current picture in a video decoder. The apparatus is configured to determine at least one candidate motion vector predictor for each of two different motion vector predictor lists, each candidate motion vector predictor associated with a reference picture. The apparatus is also configured to select a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The apparatus is further configured to generate a first reconstructed motion vector for the first motion vector predictor list using a candidate motion vector predictor of the first motion vector predictor list and a first motion vector delta retrieved from the bitstream. The apparatus is additionally configured to replace one of the at least one candidate motion vector predictor in the second motion vector predictor list with the first reconstructed motion vector or a scaled version of the first reconstructed motion vector. The apparatus is also configured to generate a second reconstructed motion vector for the second motion vector predictor list using a candidate motion vector predictor of the second motion vector predictor list and a second motion vector delta retrieved from the bitstream.

Yet another aspect of the embodiments relates to an apparatus for predicting motion vectors used for bi-prediction in video encoding of a block of a current picture in a video encoder. The apparatus comprises a determining module for determining at least one candidate motion vector predictor for each of two different motion vector predictor lists, each candidate motion vector predictor associated with a reference picture. The apparatus also comprises a selecting module for selecting a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The apparatus further comprises a first delta generating module for generating a first motion vector delta as a difference between a first actual motion vector for the block and a candidate motion vector predictor from the first motion vector predictor list. The apparatus additionally comprises a replacing module for replacing one of the at least one candidate motion vector predictor in the second motion vector predictor list with the first actual motion vector or a scaled version of the first actual motion vector. The apparatus also comprises a second delta generating module for generating a second motion vector delta as a difference between a second actual motion vector for the block and a candidate motion vector predictor from the second motion vector predictor list.

An additional aspect of the embodiments relates to an apparatus for reconstructing motion vectors used for bi-prediction in video encoding of a block of a current picture in a video decoder. The apparatus comprises a determining module for determining at least one candidate motion vector predictor for each of two different motion vector predictor lists, each candidate motion vector predictor associated with a reference picture. The apparatus also comprises a selecting module for selecting a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The apparatus further comprises a first motion vector generating module for generating a first reconstructed motion vector for the first motion vector predictor list using a candidate motion vector predictor of the first motion vector predictor list and a first motion vector delta retrieved from the bitstream. The apparatus additionally comprises a replacing module for replacing one of the at least one candidate motion vector predictor in the second motion vector predictor list with the first reconstructed motion vector or a scaled version of the first reconstructed motion vector. The apparatus also comprises a second motion vector generating module for generating a second reconstructed motion vector for the second motion vector predictor list using a candidate motion vector predictor of the second motion vector predictor list and a second motion vector delta retrieved from the bitstream.

An aspect of the embodiments relates to a computer program comprising instructions, which when executed by at least one processor, cause the at least one processor to determine, for a block of a current picture in a video sequence, at least one candidate motion vector predictor for each of two different motion vector predictor lists, each candidate motion vector predictor associated with a reference picture. The at least one processor is also caused to select a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The at least one processor is further caused to generate a first motion vector delta as a difference between a first actual motion vector for the block and a candidate motion vector predictor from the first motion vector predictor list. The at least one processor is additionally caused to replace one of the at least one candidate motion vector predictor in the second motion vector predictor list with the first actual motion vector or a scaled version of the first actual motion vector. The at least one processor is also caused to generate a second motion vector delta as a difference between a second actual motion vector for the block and a candidate motion vector predictor from the second motion vector predictor list.

Another aspect of the embodiments relates to a computer program comprising instructions, which when executed by at least one processor, cause the at least one processor to determine, for a block of a current picture in a video sequence, at least one candidate motion vector predictor for each of two different motion vector predictor lists, each candidate motion vector predictor associated with a reference picture. The at least one processor is also caused to select a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The at least one processor is further caused to generate a first reconstructed motion vector for the first motion vector predictor list using a candidate motion vector predictor of the first motion vector predictor list and a first motion vector delta retrieved from the bitstream. The at least one processor is additionally caused to replace one of the at least one candidate motion vector predictor in the second motion vector predictor list with the first reconstructed motion vector or a scaled version of the first reconstructed motion vector. The at least one processor is also caused to generate a second reconstructed motion vector for the second motion vector predictor list using a candidate motion vector predictor of the second motion vector predictor list and a second motion vector delta retrieved from the bitstream.

A further aspect of the embodiments relates to a carrier comprising a computer program as defined above. The carrier is one of an electronic signal, an optical signal, an electromagnetic signal, a magnetic signal, an electric signal, a radio signal, a microwave signal, or a computer-readable storage medium.

The embodiments presented herein use a selected reconstruction order for reconstructing the motion vectors for two different motion vector predictor lists. The reconstruction order is selected based on the candidate motion vector predictors in the motion vector predictor list, such responsive to at least one characteristic, e.g., template matching, scaling, delta values, proximity, etc., of the candidate motion vector predictors. In so doing, the solution presented herein minimizes costs for coding pictures of a video sequence while simultaneously improving performance.

BRIEF DESCRIPTION OF THE DRAWINGS

The embodiments, together with further objects and advantages thereof, may best be understood by making reference to the following description taken together with the accompanying drawings, in which:

FIG. 4 shows a flow diagram of a method for predicting motion vectors according to an exemplary embodiment.

FIG. 5 shows a flow diagram of a method for predicting motion vectors according to another exemplary embodiment.

FIG. 6 shows a flow diagram of a method for predicting motion vectors according to a further exemplary embodiment.

FIG. 7 shows a flow diagram of an additional, optional step of the method shown in FIGS. 6 and 8.

FIG. 8 shows a flow diagram of a method for reconstructing motion vectors according to an exemplary embodiment.

FIG. 14 shows a block diagram of an encoder/decoder apparatus according to one exemplary embodiment.

FIG. 15 shows a block diagram of an apparatus for predicting/reconstructing motion vector (MV) according to an exemplary embodiment.

FIG. 16 shows a block diagram of an apparatus for predicting/reconstructing motion vector (MV) according to another exemplary embodiment.

DETAILED DESCRIPTION

Figure 1:
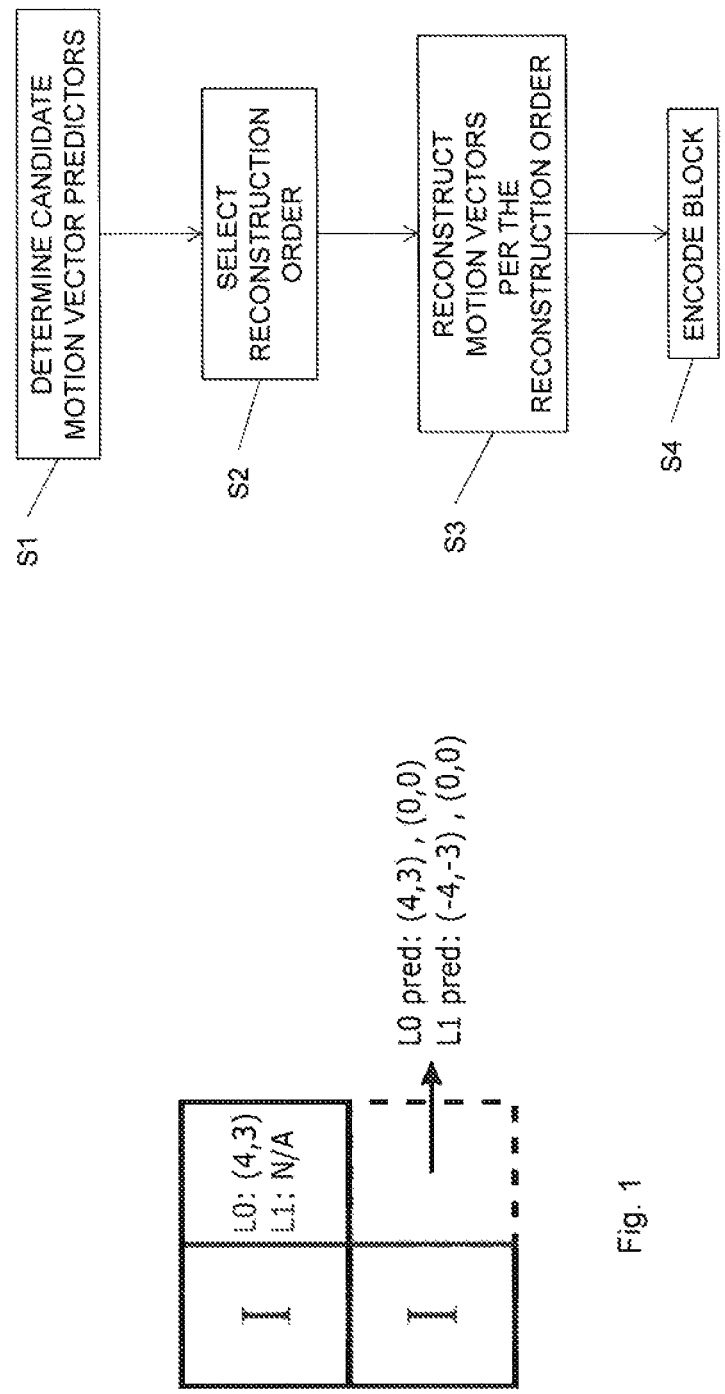
FIG. 1 shows an example of motion vector prediction for HEVC.

The present embodiments generally relate to video encoding and video decoding, and in particular to predicting and reconstructing motion vectors in connection with video encoding and video decoding.

As noted above, it is desirable to reduce the size of the encoded motion vectors. One way to achieve this goal is through the use of motion vector prediction. In motion vector prediction, instead of explicitly signaling the motion vector to be used in a block, the encoder and decoder will follow a similar procedure in order to construct a list of motion vector candidates. The encoder then signals which of the candidates should be used, along with the difference between the candidate and the desired vector, denoted motion vector delta, to the decoder.

Apart from the motion vector, each block needs to signal which previously encoded picture is to be used as reference. In one option, only one reference picture is used, which is known as uni-prediction. Another option is to use bi-prediction, in which two reference pictures are used for one block. In the case of bi-prediction, the block needs one motion vector for each reference picture.

In order to do reference picture signaling in HEVC, each picture to be encoded has two motion vector predictor lists, BL0 and L1, each containing a number of previously encoded pictures. A block then has three options: use a picture in L0 for uni-prediction, use a picture in L1 for uni-prediction, or do bi-prediction using one picture from each list. The encoder signals the choice along with an index for each list used, indicating which picture in the motion vector predictor list should be used. A motion vector then needs to be sent for each picture used for reference.

Instead of signaling motion vectors in the bitstream, motion vector predictors can be determined and then the differences between the actual motion vectors and the motion vector predictors, denoted motion vector delta, are instead signaled in the bitstream. If good motion vector predictors are available, the motion vector deltas will be small and thereby cheaper to encode as compared to encoding the actual motion vectors.

The most important source of motion vector candidates are motion vectors from neighboring, previously encoded or decoded blocks in the current picture. If these blocks use the same reference pictures, their motion vectors can simply be used as candidates as they are. If the reference pictures are different, the neighboring motion vectors can be scaled to provide candidate motion vector predictors, also referred to herein as "predictions" or "prediction candidates." This is done by assuming, for example, that if an object moved (4, 3) between pictures 2 and 4 it will probably have moved around (8, 6) between pictures 0 and 4. There are also other ways to construct prediction candidates, such as looking at previous pictures or just taking the prediction candidate (0, 0), although in HEVC there are never more than two prediction candidates per reference picture.

Each picture of a video sequence is typically associated with a picture number or identifier. In an embodiment, such a picture number or identifier is a number defining the output order of the pictures in the video sequence. In HEVC, such as picture number is denoted picture order count (POC). A distance between two pictures could then be determined based on the POCs of the two pictures. The distance could assume a positive or negative value depending on whether the picture precedes or follows the current picture in output order as defined based on the POCs. Note that a picture following a current picture according to the output order may precede the current picture according to the encoding and decoding order, i.e., is encoded and decoded prior to the current picture but is output for display after the current picture.

FIG. 1 shows an example of prediction of motion vectors, where a block is being encoded that has one neighboring inter-predicted block (the blocks marked "I" are intra-predicted). If the new block is uni-predicted from L0 or bi-predicted, it will have a motion vector referencing or associated with a picture in L0. If the new block uses the same reference picture in L0 as the above block, its prediction candidates might be (4, 3) and (0, 0). The one closest to the actual motion vector will be selected, and the difference, i.e., motion vector delta, is encoded. If the block has a motion vector referencing a reference picture in L1, or used another reference picture in L0, the only available previous motion vector, (4, 3), needs to be scaled. In this example, the reference picture in L1 is assumed to lie in the opposite side of the current picture compared to the reference picture used by the above block, but at the same distance. In this case, the motion vector is inverted, i.e., scaled by a scalar value of −1.

One method, which may be referred to herein as "L1fromL0," that is not included in HEVC is to use a scaled version of the L0 motion vector as a prediction candidate for the L1 motion vector. The idea is that when doing bi-prediction, the first coded motion vector for a block can be scaled and then used as a candidate to predict the second motion vector for the block. Because the L0 vector is fully encoded before the L1 vector in HEVC, it could be used in order to generate a prediction candidate for L1. The method is further described below.

Figure 2:
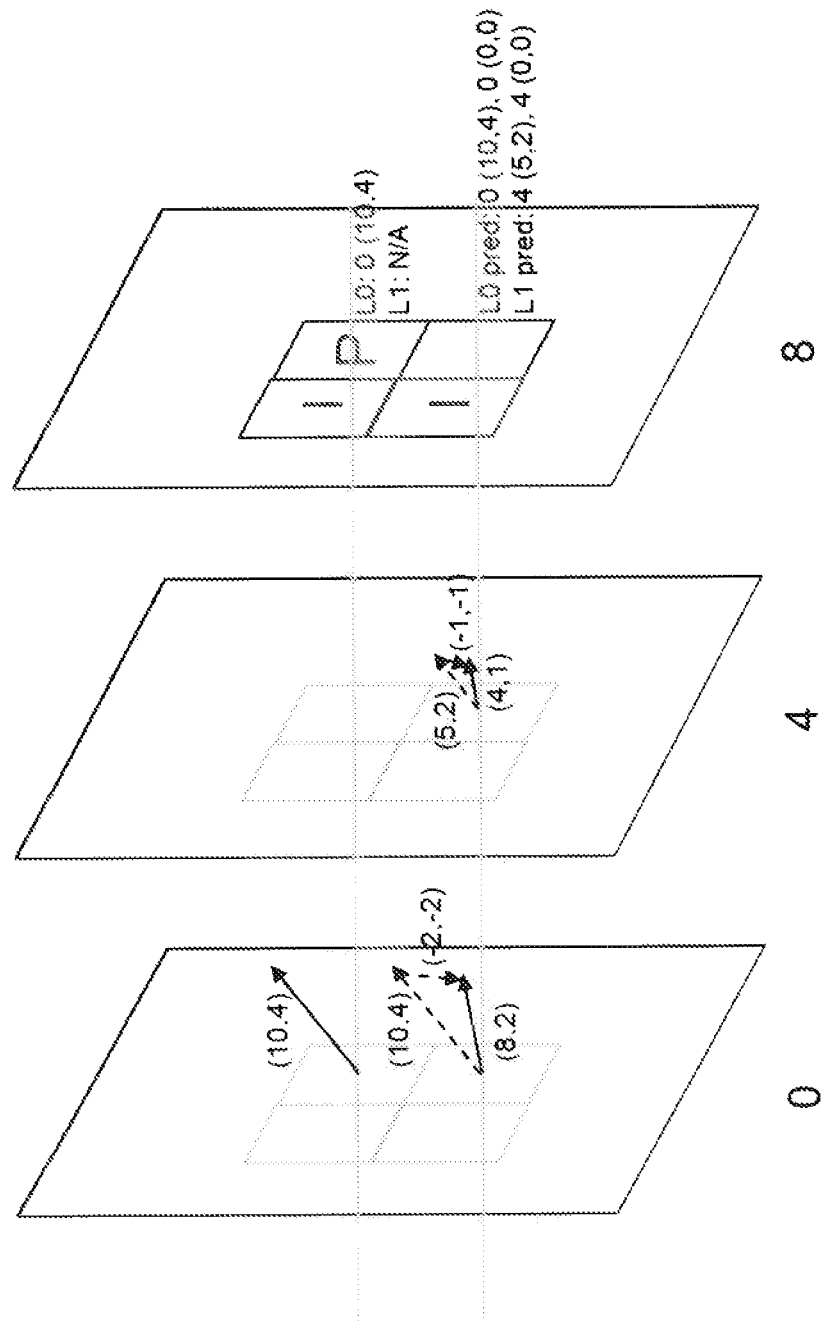
FIG. 2 shows an example of motion predictor scaling for HEVC.

In conventional motion vector prediction, there are several methods of generating prediction candidates. Most important are the spatial candidates, which are motion vectors taken from the above and left blocks. Assume that we are encoding picture 8, and have pictures 0 and 4 available as reference. If we wish to generate a motion vector for picture 4, and the above and left blocks use prediction from picture 4, the above and left motion vectors are used as-is as prediction candidates, i.e., no scaling is needed. If, however, the above block is predicted from picture 0 instead, the situation is a bit more complicated. The motion vector from the above block is scaled in order to provide a good prediction candidate for the picture 4 prediction. In this case, the x and y candidates will be divided by 2, so if (10, 4) was the motion vector for picture 0, (5, 2) will be the motion vector for prediction from picture 4, as shown in FIG. 2. In this case, we are simply assuming that the motion is uniform.

In the above example, the current block might select to use prediction from both picture 4 and picture 0. In this case, the encoder will signal bi-prediction, and select, e.g., picture 0 from the reference picture list L0, and picture 4 from the reference picture list L1. The prediction candidates are constructed separately for each motion vector, with scaling as needed as in the above example.

Figure 3:
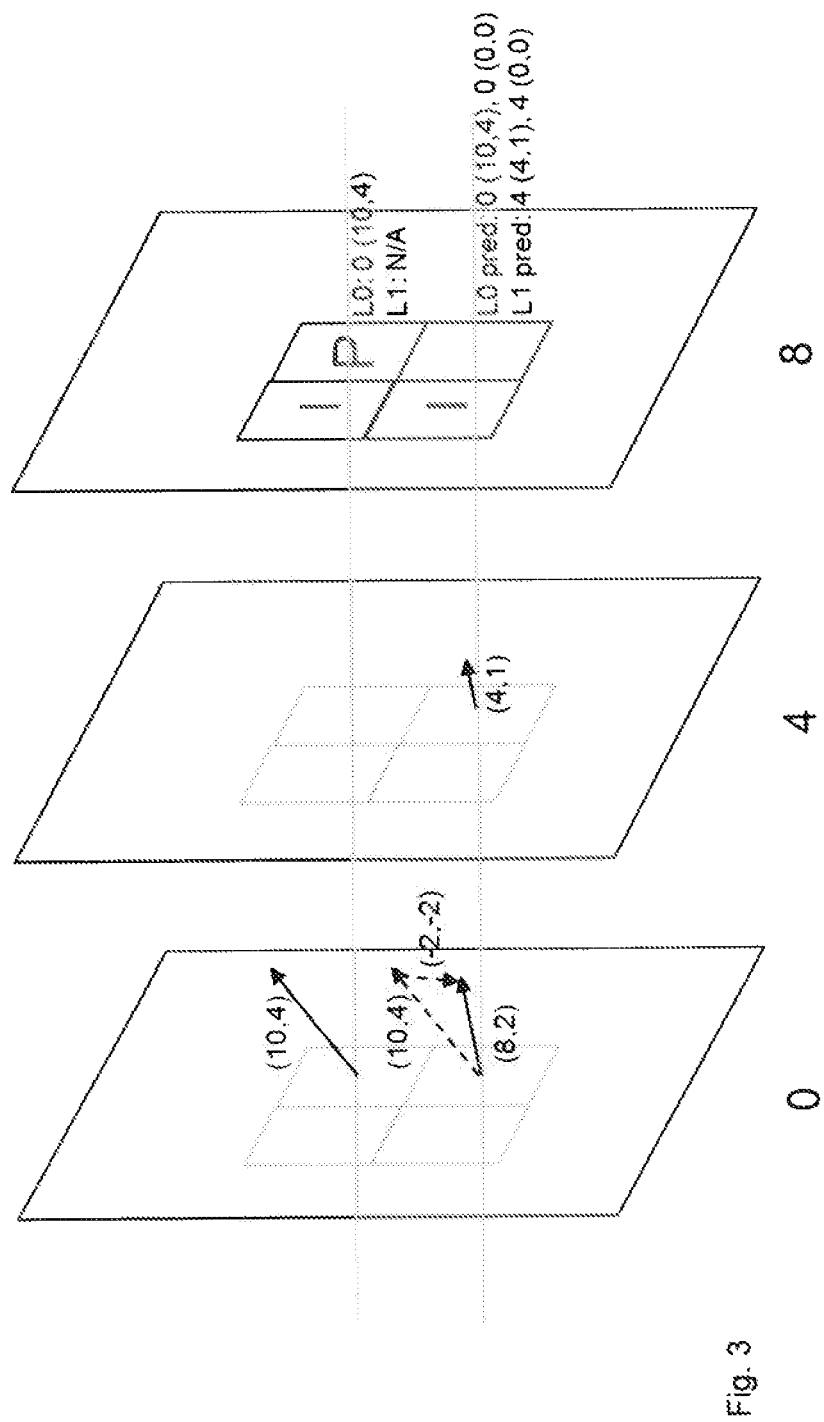
FIG. 3 shows an example of an alternative way of motion predictor scaling.

Using L1fromL0, the prediction candidates are no longer constructed separately. Instead, one motion vector is predicted or reconstructed first, e.g., the one referencing picture 0, precisely as before. Next, the other motion vector, e.g., the motion vector referencing picture 4, is reconstructed, but instead of just using the neighboring motion vectors and scaling as needed, we utilize the first actual (during encoding) or reconstructed (during decoding) motion vector, e.g., the motion vector referencing picture 0. This prediction candidate is scaled as before, and inserted first into the list of motion vector candidates, as shown in FIG. 3.

The full arrows show the motion vectors used for the current block and the neighboring P-block, while the dashed arrows shows the motion vector predictor candidates and the signaled difference. The current block could use a scaled version (5, 2) of the motion predictor candidate (10, 4) in L0 from the neighboring block to add as a candidate motion vector predictor to L1. The motion vector deltas, e.g., (−2, −2) and (1, −1), between the actual used motion vectors and the selected candidate motion vector predictors are signaled in the bitstream. By instead using a scaled version (4, 1) of the fully reconstructed motion vector (8, 2) for L1, as shown in FIG. 3, the prediction candidate could more accurately estimate the motion for the second reference picture. In this particular example, no delta motion vector needs to be signaled for the second motion vector. In general, any time L1fromL0 bi-prediction is used, one motion vector will be fully reconstructed first, scaled if necessary, and included in the list of prediction candidates for the other motion vector.

In general, the lower the absolute values of the motion vector deltas, the fewer bits are required to encode the motion vector deltas. Hence, it is generally preferred to have motion vector predictors that are equal to or at least close to the actual motion vectors to thereby result in motion vector deltas with low absolute values. In other words, a motion vector delta of (0, 0) requires fewer bits to encode as compared to a motion vector delta of, for instance, (1, 1), which in turn requires fewer bits to encode as compared to a motion vector delta of, for instance, (1, 4).

Experiments show that this noticeably improves compression performance. The L1fromL0 idea introduced a new prediction candidate, which is typically better than the previously used spatial candidates and therefore beneficial. However, it is better in some cases than others. In particular, when predicting L1 from L0 it is most helpful when the available prediction candidates for L1 are poor, such as when they have been scaled. In order to partially solve this, we propose judging whether L0 or L1 has the best prediction candidates (not including the extra candidate introduced by L1fromL0). The motion vector for the list judged to have the best prediction candidates is then predicted and coded first. In some embodiments, the motion vector with worse prediction candidates can then use the reconstructed motion vector as a prediction candidate.

FIG. 4 shows an exemplary method for predicting motion vectors used for bi-prediction in video encoding of a block of a current picture in a video encoder. The video encoder determines at least one candidate motion vector predictor for each of two different motion vector predictor lists, e.g., L0 and L1 (block S1). Each candidate motion vector predictor is associated with a reference picture. While not required, in some embodiments each candidate motion vector predictor is associated with a different reference picture. The video encoder then selects a reconstruction order for the motion vector predictor lists based on the candidate motion vector predictors (block S2), such as responsive to characteristic(s) of the candidate motion vector predictors. Exemplary characteristics include, but are not limited to, template matching, scaling, delta values, proximity, etc. The selected reconstruction order identifies one of the two different motion vector predictor lists as a first motion vector predictor list (to be reconstructed first) and the other of the two different vector lists as a second motion vector predictor list (to be reconstructed second). The video encoder then reconstructs a motion vector for each of the motion vector predictor lists according to the selected reconstruction order (block S3). To that end, the video encoder first generates a first reconstructed motion vector using the at least one candidate motion vector predictor of the first motion vector predictor list, and subsequently generates a second reconstructed motion vector using the at least one candidate motion vector predictor of the second motion vector predictor list. Using the first and second reconstructed motion vectors, the video encoder encodes the block of the current picture (block S4).

While the method in FIG. 4 was described in terms of encoding, e.g., encoding a block of a picture using the reconstructed motion vectors, it will be appreciated that the same method can be used for decoding a block of a picture. For example, a video decoder may reconstruct the motion vectors as described, and then decode the current picture block using the reconstructed motion vectors. In such a case, the block S4 is replaced by decoding the block of the current picture using the first and second reconstructed motion vectors.

FIG. 5 shows another exemplary method for predicting motion vectors used for bi-prediction that may be implemented by a video encoder/decoder. In this embodiment, at least one candidate motion vector predictor is determined for each of two different motion vector predictor lists, where each vector list is associated with a reference picture (block S10). A first reconstructed motion vector is generated for a first reference picture using the at least one candidate motion vector predictor of a first motion vector predictor list, where the first motion vector predictor list comprises one of the two different motion vector predictor lists (block S11). The at least one candidate motion vector predictor for a second motion vector predictor list is determined using a motion vector derived from the first reconstructed motion vector (block S12), where the second motion vector predictor list comprises the other one of the two different motion vector predictor lists. In some embodiments, this may be done by replacing one of the candidate motion vector predictors in the second motion vector predictor list with the motion vector derived from the first reconstructed motion vector. A second reconstructed motion vector for the second reference picture is generated using the at least one candidate motion vector predictor of the second motion vector predictor list (block S13). The block of the current picture is then encoded or decoded using the first and second reconstructed motion vectors (block S14).

An embodiment relates to a method for predicting motion vectors used for bi-prediction in video encoding of a block of a current picture in a video encoder. The method comprises determining at least one candidate motion vector predictor for each of a first motion vector predictor list and a second motion vector predictor list. Each candidate motion vector predictor is associated with a reference picture. A first motion vector delta is generated as a difference between a first actual motion vector for the block and a candidate motion vector predictor from the first motion vector predictor list. One of the at least one candidate motion vector predictor in the second motion vector predictor list is replaced with the first actual motion vector or a scaled version of the first actual motion vector. Then, a second motion vector delta is generated as a difference between a second actual motion vector for the block and a candidate motion vector predictor from the second motion vector predictor list.

In a particular embodiment, the second motion vector delta is generated, such as calculated, as a difference between the second actual motion vector for the block and the candidate motion vector predictor equal to the first actual motion vector or the scaled version of the first actual motion vector from the second motion vector predictor list.

Another embodiments relates to a method for predicting motion vectors used for bi-prediction in video decoding of a block of a current picture in a video encoder. The method comprises determining at least one candidate motion vector predictor for each of a first motion vector predictor list and a second motion vector predictor list. Each candidate motion vector predictor is associated with a reference picture. A first reconstructed motion vector delta is generated for the first motion vector predictor list using a candidate motion vector predictor of the first motion vector predictor list and a first motion vector delta retrieved from the bitstream. One of the at least one candidate motion vector predictor in the second motion vector predictor list is replaced with the first reconstructed motion vector or a scaled version of the first reconstructed motion vector. Then, a second reconstructed motion vector delta is generated for the second motion vector predictor list using a candidate motion vector predictor of the second motion vector predictor list and a second motion vector delta retrieved from the bitstream.

In a particular embodiment, the second reconstructed motion vector delta is generated for the second motion vector predictor list using the candidate motion vector predictor equal to the first reconstructed motion vector or the scaled version of the first reconstructed motion vector of the second motion vector predictor list and the second motion vector delta retrieved from the bitstream.

FIG. 6 shows an exemplary method for predicting motion vectors used for bi-prediction in video encoding of a block of a current picture in a video encoder. The method comprises determining, in step S20, at least one candidate motion vector predictor for each of the two different motion vector predictor lists. Each candidate motion vector predictor is associated with a reference picture. A next step S21 comprises selecting a reconstruction order for the motion vector predictor lists based on the candidate motion vector predictors. The reconstruction order identifies one of the two different motion vector predictor lists as a first motion vector predictor list and the other of the two different motion vector predictor lists as a second motion vector predictor list.

A first motion vector delta is generated in step S22 as a difference between a first actual motion vector for the block and a candidate motion vector predictor from the first motion vector predictor list. One of the at least one candidate motion vector predictor in the second motion vector predictor list is replaced in step S23 with the first actual motion vector or a scaled version of the first actual motion vector. Then, a second motion vector delta is generated in step S24 as a difference between a second actual motion vector for the block and a candidate motion vector predictor from the second motion vector predictor list.

Thus, according to the embodiments, a reconstruction order is determined that defines which of the two different motion vector predictor lists, L0 and L1, that should be processed first, i.e., be regarded as the first motion vector predictor list according to the reconstruction order, and before processing the second motion vector predictor list according to the reconstruction order. This reconstruction order is selected in step S21 based on the candidate motion vector predictors determined in step S20, such as based on, i.e., responsive to, at least one characteristic or property of the candidate motion vector predictors.

The selection of a reconstruction order may, thus, lead to a situation in which the list L1 is processed first followed by the list L0 for some blocks, whereas for other blocks the list L0 is processed first followed by the list L1.

The embodiments predict motion vectors in the case of bi-prediction. This means that the current block has two reference pictures, one from the list L0 and one from the list L1. These two reference pictures are typically different previously encoded pictures of the video sequence, but could actually be the same previously encoded picture. The current block has two so-called actual motion vectors, wherein one is associated with the reference picture from list L0 and defines the difference between the position of the prediction block, also denoted prediction unit (PU), in the reference picture from list L0 and the position of the current block in the current picture. The other actual motion vector is then associated with the reference picture from list L1 and defines the difference between the position of the prediction block in the reference picture from list L1 and the position of the current block in the current picture.

The candidate motion vector predictors determined in step S20 for each of the two different motion vector predictor lists are preferably determined based on the actual motion vector(s) for neighboring, previously encoded block(s) in the current picture. The neighboring, previously encoded block(s) is(are) preferably a block positioned immediately above the current block and/or a block positioned immediately to the left of the current block. The neighboring, previously encoded block should in addition have at least one actual motion vector, i.e., be inter or bi-directionally inter predicted.

Hence, in an embodiment, step S20 comprises determining the at least one candidate motion vector predictor at least partly based on an actual motion vector of a neighboring, previously encoded block in the current picture or a scaled version of the actual motion vector.

In such an embodiment, the neighboring, previously encoded block could be the block immediately to the left of the current block, the block immediately above the current block. Alternatively, actual motion vectors, or scaled versions thereof, from both these two neighboring, previously encoded blocks could be used as candidate motion vector predictors. This has been described above, such as in connection with FIGS. 1 and 2.

Once the reconstruction order of the motion vector predictor lists has been selected in step S21, the motion vector deltas are generated, such as calculated, in steps S22 and S24 according to the reconstruction order, i.e., starting with the motion vector predictor list selected as the first motion vector predictor list according to the reconstruction order in step S22 and then the second motion vector predictor list according to the reconstruction order in step S24.

A motion vector delta is generated as a difference between the actual motion vector associated with the reference picture from the first motion vector predictor list and a candidate motion vector predictor from the first motion vector predictor list in step S22. However, prior to generating the second motion vector delta in step S24, the actual motion vector associated with the reference picture from the first motion vector predictor list according to the reconstruction order or a scaled version thereof replaces one of the at least one candidate motion vector predictor in the second motion vector predictor list.

For instance, assume that the candidate motion vector predictors for the list L0 are determined to be (0, 0) and (−1, 1) in step S20, whereas corresponding candidate motion vector predictors for the list L1 are determined in step S20 to be (0, 0) and (−2, 5). Furthermore, assume that the actual motion vector for the list L0 is (5, −11) and the actual motion vector for the list L1 is (−4, 10). In this example, the reconstruction order is selected to be list L1 followed by list L0, i.e., list L1 is the first motion vector predictor list and list L0 is the second motion vector predictor list.

The motion vector deltas for the candidate motion vector predictors (0, 0) and (−2, 5) become (−4, 10)−(0, 0)=(−4, 10) and (4−, 10)−(−2, 5)=(−2, 5), respectively, for the list L1. Since (−2, 5) is cheaper to encode, i.e., requires fewer bits, as compared to (−4, 10), the candidate motion vector predictor (−2, 5) is selected for the first motion vector predictor list (list L1), resulting in the first motion vector delta (−2, 5).

In step S23 of this example, the candidate motion vector predictor (0, 0) of the second motion vector predictor list (list L0) is replaced by a scaled version (using a scalar value of −1) of first actual motion vector (−4, 10), resulting in the candidate motion vector predictors (4, −10), (−1, 1) for the second motion vector predictor list. The motion vector deltas for these candidate motion vector predictors become (5, −11)−(−4, 10)=(1, −1) and (5, −11)−(−1, 1)=(6, −12), respectively. Since (1, −1) is cheaper to encode as compared to (6, −12), the candidate motion vector predictor (−4, 10) is selected for the second motion vector predictor list (list L0), resulting in the second motion vector delta (1, −1).

In an embodiment, step S24 comprises generating the second motion vector delta as a difference between the second actual motion vector and the candidate motion vector predictor equal to the first actual motion vector or the scaled version of the first actual motion vector. In this embodiment, the new candidate motion vector predictor introduced in the second motion predictor list in step S23 is thereby used as candidate motion vector predictor in step S24.

FIG. 7 is a flow chart illustrating an additional, optional step of the method shown in FIG. 6. In this embodiment, the method continues from step S22. A next step S40 comprises scaling the first actual motion vector to obtain the scaled version of the first actual motion vector with a scalar value defined based on a distance in output order between the current picture and a reference picture associated with the first actual motion vector and a distance in output order between the current picture and a reference picture associated with the second actual motion vector.

Thus, if the first actual motion vector is represented by (x, y), then the scaled version thereof is represented by (sx, sy), wherein s represents the scalar value, which could be positive or negative. In a particular embodiment, the scalar value s=(POC(current)−POC(second))/(POC(current)−POC(first)), wherein POC(current) represents the POC value of the current picture, POC(first) represents the POC value of the reference picture associated with the first actual motion vector and POC(second) represents the POC value of the reference picture associated with the second actual motion vector.

In an embodiment, step S23 comprises determining whether any of the at least one candidate motion vector predictor in the second motion vector predictor list was previously scaled by a scalar value. In such a case, the previously scaled candidate motion vector predictor is replaced with the first actual motion vector or the scaled version of the first actual motion vector if the second motion vector predictor list includes a previously scaled candidate motion vector predictor. This means that if the second motion vector predictor list includes any previously scaled candidate motion vector predictor then preferably such scaled candidate motion vector predictor is replaced by the first actual motion vector or the scaled version thereof in step S23. This generally improves the gain as is further described herein.

In an embodiment, the method shown in FIG. 6 comprises an additional step of encoding the block in step S25 to form a bitstream comprising encoded representations of the first motion vector delta and the second motion vector delta. The bitstream preferably also comprises a respective index for the motion vector predictor list to identify the respective reference pictures.

In a particular embodiment, a syntax element defining the selected reconstruction order as selected in step S21 is included in the bitstream. This particular embodiment thereby comprises signaling the selected reconstruction order in the bitstream to a video decoder. In other embodiments, no explicit signaling of the selected reconstruction order is needed. In clear contrast, the video decoder can determine the selected reconstruction order in a similar way as has been described above. These other embodiments thereby relax the need for including any such syntax element in the bitstream, which in turn reduces the number of bits of the bitstream.

FIG. 8 shows an exemplary method for reconstructing motion vectors used for bi-prediction in video decoding of a block of a current picture in a video decoder. The method comprises determining, in step S30, at least one candidate motion vector predictor for each of the two different motion vector predictor lists. Each candidate motion vector predictor is associated with a reference picture. A next step S31 comprises selecting a reconstruction order for the motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector predictor lists as a second motion vector predictor list.

A first reconstructed motion vector is generated in step S32 for the first motion vector predictor list using a candidate motion vector predictor of the first motion vector predictor list and a first motion vector delta retrieved from the bitstream. One of the at least one candidate motion vector predictor in the second motion vector predictor list is replaced in step S33 with the first reconstructed motion vector or a scaled version of the first reconstructed motion vector. Then, a second reconstructed motion vector is generated in step S34 for the second motion vector predictor list using a candidate motion vector predictor of the second motion vector predictor list and a second motion vector delta retrieved from the bitstream.

The method as shown in FIG. 8 and preferably implemented in a video decoder maps to the corresponding method as shown in FIG. 6 and preferably implemented in a video encoder. Thus, candidate motion vector predictors are determined and a reconstruction order is selected. In FIG. 8, reconstructed motion vectors are generated based on candidate motion vector predictors and motion vector deltas, whereas in FIG. 6 these motion vector deltas are generated.

In an embodiment, step S30 of FIG. 8 comprises determining the at least one candidate motion vector predictor at least partly based on a reconstructed motion vector of a neighboring, previously decoded block in the current picture or a scaled version of the reconstructed motion vector.

This embodiment of step S30 thereby corresponds to a previously described embodiment of step S20 but with the difference that reconstructed motion vector(s) or scaled version(s) thereof from neighboring, previously decoded block(s) in the current picture are determined as candidate motion vector predictor(s) in step S30, whereas step S20 instead determined candidate motion vector predictor(s) at least partly based on actual motion vector(s) of neighboring, previously encoded block(s) in the current picture. The neighboring, previously decoded block(s) is(are) preferably a block immediately above the current block and/or a block immediately to the left of the current block when assuming an encoding and decoding order going from up to down and from left to right in the current picture.

In an embodiment of step S31, the reconstruction order is selected based on a syntax element retrieved from the bitstream. In such a case, this syntax element has been determined and included in the bitsream at the video encoder side. The syntax element thereby signals the order at which the two motion vector predictor lists should be processed, i.e., defines which motion vector predictor list that is to constitute the first motion vector predictor list for the current block and which motion vector predictor list that should be the second motion vector predictor list. In an embodiment, the syntax element is a flag assuming the value Oba$_n$ or 1 bin to thereby signal whether the list L0 is the first motion vector predictor list and the list L1 is the second motion vector predictor list or whether the list L1 is the first motion vector predictor list and the list L0 is the second motion vector predictor list. If there are more than two motion vector predictor lists, the syntax element comprises more than one bit.

The above described embodiment, however, requires introducing a syntax element, such as flag, in the bitstream for each bi-directionally predicted block in the pictures of the video sequence. In another embodiment, the reconstruction order for the two different motion vector predictor lists is selected in step S31 based on the candidate motion vector predictors determined in step S30, such as responsive to at least one characteristic of the candidate motion vector predictors. This another embodiment thereby does not require signaling information of the reconstruction order for the blocks from the video encoder to the video decoder, thereby reducing the total amounts of bits in the bitstream.

In an embodiment, first and second reconstruction motion vectors are generated in steps S32 and S34 by adding the respective motion vector delta to the respective candidate motion vector predictor, i.e., MVrec=MVcand+MVΔ, wherein MVrec represents a reconstructed motion vector, MVcand represents a candidate motion vector predictor and MVΔ represents a motion vector delta.

In steps S32 and S34, and in particular in step S32, if more than one candidate motion vector predictor is available from the motion vector predictor list, the bitstream preferably comprises a syntax element, such as an index, indicating which candidate motion vector that should be selected from the motion vector predictor list and added to the motion vector predictor.

Step S33 in FIG. 8 corresponds to step S23 in FIG. 6. However, in step S23 a candidate motion vector predictor in the second motion vector predictor list was replaced by the first actual motion vector or a scaled version thereof. In step S33, a candidate motion vector predictor in the second motion vector predictor list is instead replaced by the first reconstructed motion vector generated in step S32 or a scaled version thereof.

In a particular embodiment, step S34 comprises generating the second reconstructed motion vector using the candidate motion vector predictor equal to the first reconstructed motion vector or the scaled version thereof and the second motion vector delta. Hence, in this embodiment the candidate motion vector predictor added to the second motion vector predictor list in step S33 is thereby used to generate the second reconstructed motion vector in step S34 according to this particular embodiment.

In an embodiment, the method comprises the additional, optional step S40 as shown in FIG. 7. In such a case, the method continues from step S32 to step S40. Step S40 comprises scaling the first reconstructed motion vector to obtain the scaled version thereof with a scalar value defined based on a distance in output order between the current picture and a reference picture associated with the first motion vector delta and a distance in output order between the current picture and a reference picture associated with the second motion vector delta.

In this embodiment, a reference picture associated with a motion vector delta means that the reference picture is preferably identified based on an index to be used for the current picture and for the motion vector predictor list that has the same number as the relevant motion vector delta. This means that the prediction block to be used as prediction basis for the current block is identified in the reference picture based on the reconstructed motion vector generated based on the motion vector delta and a candidate motion vector predictor identified from the relevant motion vector predictor list.

The generation or calculation of the scalar value to be used to scale the first reconstructed motion vector is preferably performed as previously described herein, such as based on POC values of the pictures.

In an embodiment, step S33 comprises determining whether one of the at least one candidate motion vector predictor in the second motion vector predictor list was previously scaled by a scalar value. Step S33 also comprises, in this embodiment, replacing the previously scaled candidate motion vector predictor with the first reconstructed motion vector or the scaled version thereof if the second motion vector predictor list includes a previously scaled candidate motion vector predictor.

In an embodiment, the method shown in FIG. 8 comprises an additional step of decoding the current block in step S35 for form a decoded block. This step S35 preferably comprises decoding the current block at least partly based on the first and second reconstructed motion vectors generated in steps S32 and S34, respectively.

The selection of reconstruction order based on the candidate motion vector predictors in step S21 in FIG. 6 and step S31 in FIG. 8 can be performed according to various embodiments.

In general, the selection of the reconstruction order may be based on, i.e., responsive to, at least one characteristic or property of the candidate motion vector predictors. Such characteristics or properties may, for instance, include values of the candidate motion vector predictors; template matching characteristics of the candidate motion vector predictors, i.e., whether the candidate motion vector predictors are determined in step S20 or S30 using template matching; scaling characteristics of the candidate motion vector predictors, i.e., whether the candidate motion vector predictors have been scaled in the determination of step S20 or S30; and/or the distance between current picture and the respective reference picture associated with the candidate motion vector predictors.

In an embodiment, the selection comprises generating a respective motion vector delta as a difference between an actual motion vector for the block and a respective candidate motion vector predictor. The reconstruction order is then selected by identifying the motion vector predictor list associated with the smallest motion vector delta value as the first motion vector predictor list.

This embodiment is in particular applicable in step S21 performed at the video encoder that has access to the actual motion vectors for the block. Hence, this embodiment is thereby preferably performed in connection with including a syntax element defining the reconstruction order in the bitstream so that the selection in step S31 is performed based on the syntax element retrieved from the bitstream.

This embodiment thereby starts the processing of motion vectors, i.e., generating motion vector deltas in FIG. 6 and generating reconstructed motion vectors in FIG. 8, with the smallest motion vector delta. The assumption here is that applying the replacement of candidate motion vector predictor, the first reconstructed motion vector or the scaled version thereof will be a better candidate motion vector predictor and thereby result in a smaller motion vector delta. Measuring or determining which motion vector delta that is largest can be done by simply adding together the absolute values of the x and y components of the motion vector delta or adding together the square of the components.

In another embodiment, steps S21 and S31 comprise determining whether one of the motion vector predictor lists includes a template matching candidate motion vector predictor. If one of the motion vector predictor lists includes a template matching candidate motion vector predictor, the reconstruction order is selected by identifying the motion vector predictor list that includes the template matching candidate motion vector predictor as the first motion vector predictor list.

Briefly, template matching is used to derive motion information of a current block by finding the best match between a template, typically top and/or left neighboring blocks of the current block, in the current picture and a block, same size to the template, in a reference picture. More information of template matching can be found in JVET of ITU-T SG 16 WP 3 and ISO/IEC JTC 1/SC 29MG 11, Geneva, CH, 19-21 Oct. 2015, Document: JVET-A1001, Algorithm Description of Joint Exploration Test Model 1 and in particular in section 2.4.6 Pattern matched motion vector derivation of this document.

Figure 9:
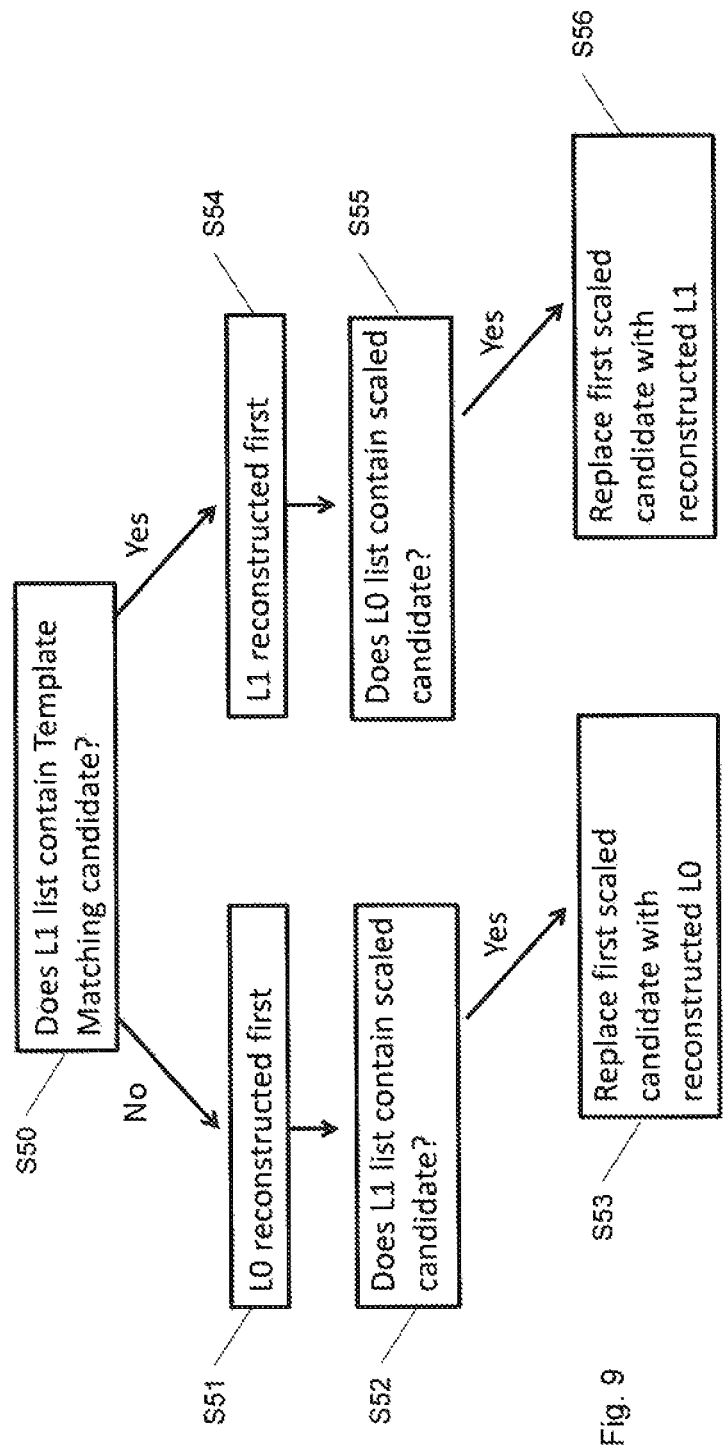
FIG. 9 shows a flow diagram of a method for predicting motion vectors according to a further exemplary embodiment.

This embodiment is schematically illustrated in FIG. 9, described further below, together with identifying the candidate motion vector predictor to replace in step S23 and S33 as a candidate motion vector predictor that has been scaled by a scalar value.

In a further embodiment, steps S21 and S31 comprise determining whether one of the motion vector predictor lists includes a candidate motion vector predictor that was previously scaled by a scalar value. The reconstruction order is then selected by identifying the motion vector predictor list that includes the candidate motion vector predictor that was previously scaled as the second motion vector predictor list, and identifying the remaining motion vector predictor list as the first motion vector predictor list.

In yet another embodiment, the two embodiments disclosed above are combined. Hence, steps S21 and S31 comprise determining whether one of the motion vector predictor lists includes a template matching candidate motion vector predictor and determining whether one of the motion vector predictor lists includes a candidate motion vector predictor that was previously scaled by a scalar value. If one of the motion vector predictor lists includes a template matching candidate motion vector predictor, the reconstruction order is selected by identifying the motion vector predictor list that includes the template matching candidate motion vector predictor as the first motion vector predictor list. Otherwise, i.e., no template matching candidate motion vector predictor, the reconstruction order is selected by identifying the motion vector predictor list that includes the candidate motion vector predictor that was previously scaled as the second motion vector predictor list, and identifying the remaining motion vector predictor list as the first motion vector predictor list.

In a further embodiment, steps S21 and S31 comprise identifying which of the reference pictures associated with the candidate motion vector predictors of the two motion vector predictor lists is closest in display order to the current picture and defining it as a first reference picture. The reconstruction order is then selected by identifying the motion vector predictor list associated with the first reference picture as the first motion vector predictor list.

These different embodiments of selecting reconstruction order based on the candidate motion vector predictors, such as responsive to at least one characteristic of the candidate motion vector predictors, will be further described herein.

In one embodiment of the solution presented herein, the syntax of the bitstream sent from the video encoder to the video decoder is not changed. The video encoder would still typically send information for L0 first, followed by information for L1. However, because one of the motion vectors might be predicted from the others, the reconstruction of the information into actual motion vectors needs to be done in a specific order. This is different from when the solution presented herein is not used, where both vectors can be reconstructed independently once the information is decoded.

When reconstructing the vectors in one embodiment, first two candidate motion vector predictors are constructed for each motion vector without using L1fromL0 (steps S20 and S30). Next, a pre-determined algorithm may be used to select which of the motion vectors should be reconstructed first (steps S21 and S31). The selected motion vector can then be reconstructed (steps S22 and S32). Next, the reconstructed vector is scaled, and added to the first or second position of the motion vector predictor list for the second motion vector, shifting the remaining predictors downwards (steps S23 and S33). It is also possible that in some cases the new prediction candidate is not added to the list at all for some blocks.

The determination of which of the motion vectors to reconstruct first might look at several factors. One important factor is whether there is a template matching candidate, which might be the case in the current version of JEM (Exploration model used in JVET). Another, which applies to HM (HEVC reference software) as well, is whether the spatial candidates have been scaled or not.

The core essence of an embodiment presented herein is that the reconstruction order of the motion vectors is changed based on generations done on the prediction lists. This makes sense whenever some dependency between the vectors is introduced, e.g., as when using L1fromL0.

In one exemplary embodiment, shown in FIG. 9, the method comprises first checking, in step S50, whether the list L1 contains a template matching candidate. If it does, the method continues to step S54. In this step S54, the list L1 is reconstructed first, and the list L0 might predict from it. However, if the list L1 does not contain a template matching candidate as checked in step S50, the method continues to step S51, where the list L0 is reconstructed first. After the first vector has been reconstructed in step S51 or S54, the method comprises checking, in step S52 or S55, whether the candidate list for the other motion vector, i.e., list L1 in step S52 and list L0 in step S55, contains any scaled candidates. If it does as checked in step S52 or S55, the first scaled candidate in list L1 is replaced by a scaled version of the already reconstructed motion vector in step S53 or the first scaled candidate list in L0 is replaced by a scaled version of the already reconstructed motion vector in step S56. This exemplary embodiment as shown in FIG. 9 has been tested and gives gains of 0.14%.

Thus, in this exemplary embodiment, the method first comprises checking or determining whether one of the motion vector predictor lists, typically list L1, contains a template matching candidate motion vector predictor in step S50. If the motion vector predictor list contains such a template matching candidate motion vector predictor that motion vector predictor list is reconstructed first in step S51 or S54. Thus, if one of the motion vector predictor lists includes a template matching candidate motion vector predictor, selecting the reconstruction order comprises identifying the motion vector predictor list that includes the template matching candidate vector predictor as the first motion vector predictor list in step S51 or S54. Thereafter, the candidate motion vector predictor to replace in the second motion vector predictor list in step S53 or S56 is a candidate motion vector predictor that was previously scaled by a scalar value as checked or determined in step S52 or S55.

Another embodiment, which disregards template matching, will instead start by checking if L0 contains a scaled candidate. In that case, L1 is reconstructed first. The algorithm then proceeds as before, inserting a scaled version of the vector reconstructed first into the candidate list of the second vector by replacing the first scaled vector there, if there is one.

A more complex combination of these two embodiments will use the template matching information to select the reconstruction order if exactly one of the L0 and L1 lists contain a template matching candidate; otherwise it will use the scaling information to select the reconstruction order.

There are many different possibilities when it comes to exactly how to derive a reconstruction order given the two prediction lists, when to insert a candidate from the first list into the second, and in which position. The above embodiments are merely examples of good choices. Another way of determining which motion vector to reconstruct first is to always start reconstructing the motion vector that has the smallest delta motion vector. The assumption here is that by applying the L1fromL0 algorithm, the motion predictor that is scaled from the fully reconstructed first motion vector will have a better prediction and thus a smaller delta motion vector. The method ensures that the delta motion vector for the motion vector to decode first has a smaller delta motion vector than the other motion vector. Measuring which motion vector is smallest can be done by adding together the absolute value of the x and y components of the delta vector, or adding together the square of the components.

In another embodiment, the reconstruction order is instead signaled in the bitstream which motion vector that should be decoded first. This could either be done by indicating with a bit which motion vector to reconstruct first or by indicating which motion vector comes first in the bitstream or by indicating that the reconstruction order has been swapped from the normal reconstruction order. This bit could, e.g., be bypass encoded or encoded using arithmetic coding, such as Context Adaptive Binary Arithmetic Coding (CABAC). This bit would ideally be signaled individually for each prediction block or unit (PU), but could also be signaled at any other level, such as coding block or unit (CU), tile, slice or in the picture parameter set (PPS).

In another embodiment, the order is only explicitly signaled if the first criterion is not conclusive. For example, if the scaling of the two motion vectors are done with the same absolute factor, i.e., in opposite directions, then a bit could be used to determine which one to start to reconstruct. One example of this embodiment would be to use the template matching-based embodiment where the reconstruction order is selected based on template matching characteristics, but if both or neither of the motion vector predictor lists contain template matching candidates, a bit is signaled to determine which to reconstruct first.

In still another, the reconstruction order is decided implicitly without looking at the prediction lists, e.g., by reconstructing L0 first unless the picture chosen for prediction for L0 is further away in display order than the picture chosen for prediction for L1.

In another embodiment according to any of the previous embodiments, a flag is signaled that indicates whether to use the list swapping as described in the solution presented herein. This flag could, e.g., be placed in the sequence parameter set (SPS), the PPS or the slice header. The flag could for instance be called list_order_swapping_enabled_flag. If the flag is set, the reconstruction of the lists is done in an order described in any of the previous embodiments allowing the second reconstructed list to predict from the first reconstructed list. If the flag is not set, L0 is always reconstructed before L1.

In another embodiment, it is anticipated that more than two lists are used by a future codec, e.g., L0, L1 and L2. The reason for having more than two lists could, e.g., be to represent a non-linear motion path or to present a plane in spatial-temporal space. In this embodiment, analog to the previous embodiments, each list but the first one could be predicted from at least one of the previous reconstructed lists.

Figure 10:
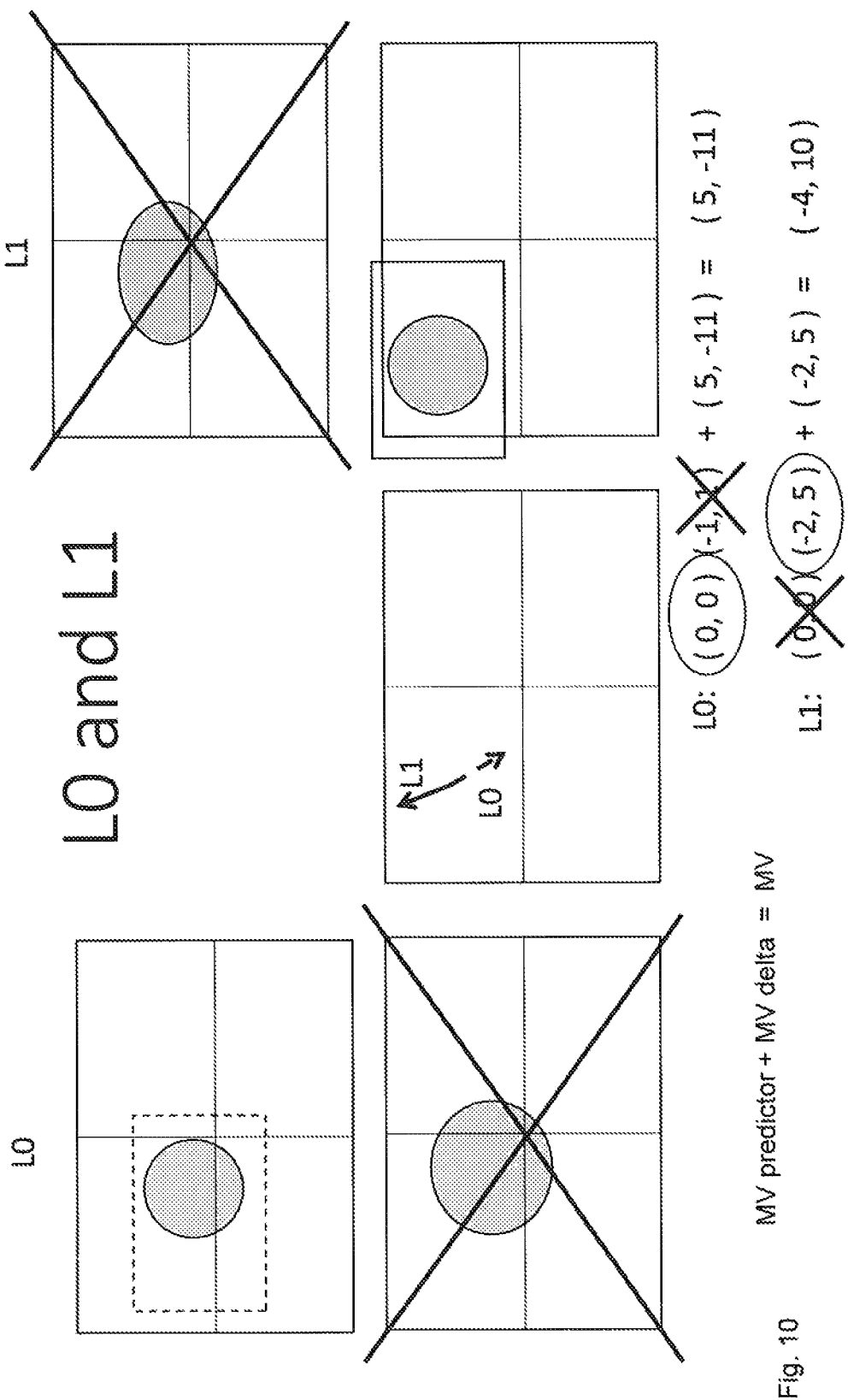
FIG. 10 shows an example of motion vector reconstruction for L0 and L1.
Figure 11:
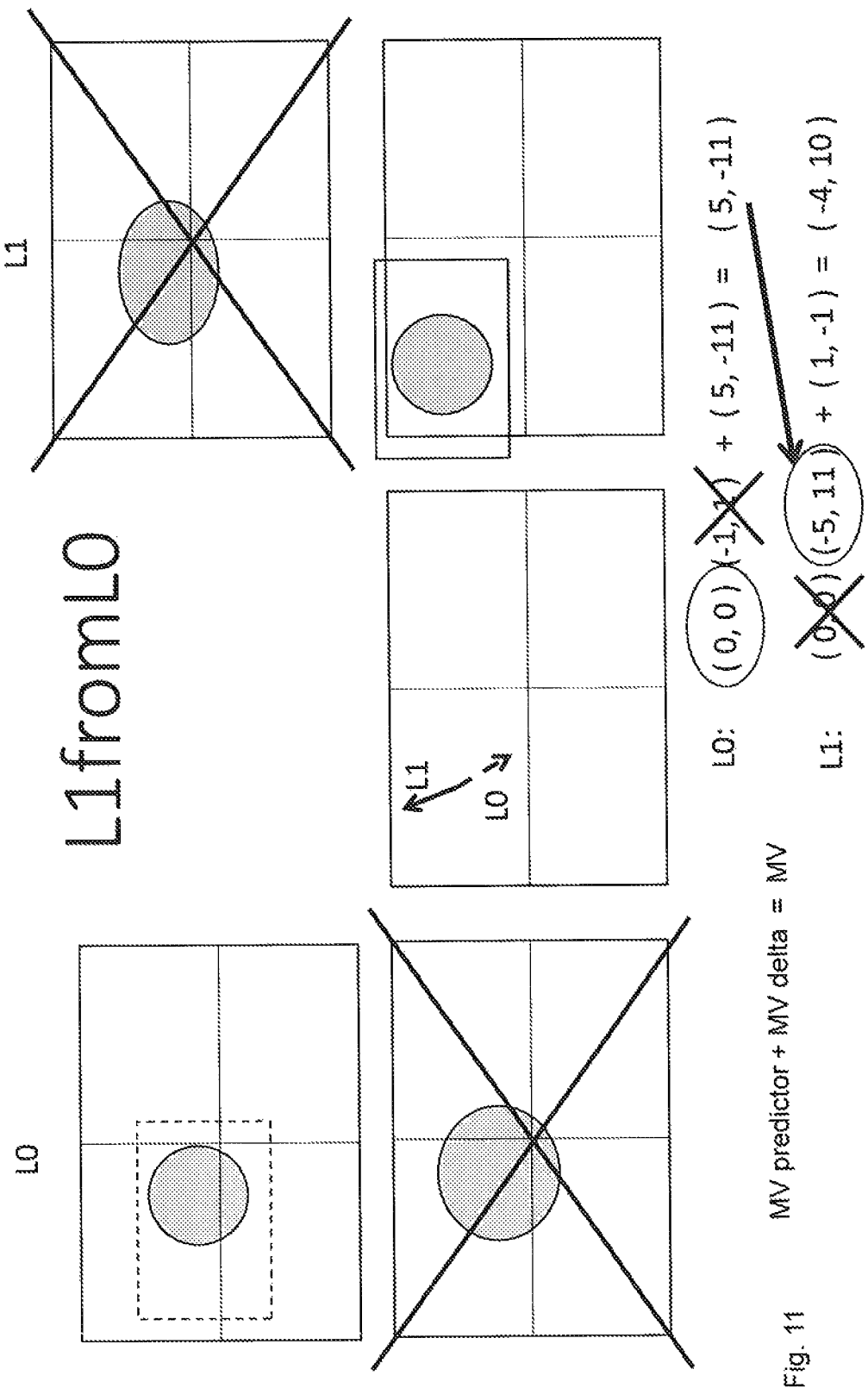
FIG. 11 shows another example of motion vector reconstruction for L0 and L1.
Figure 12:
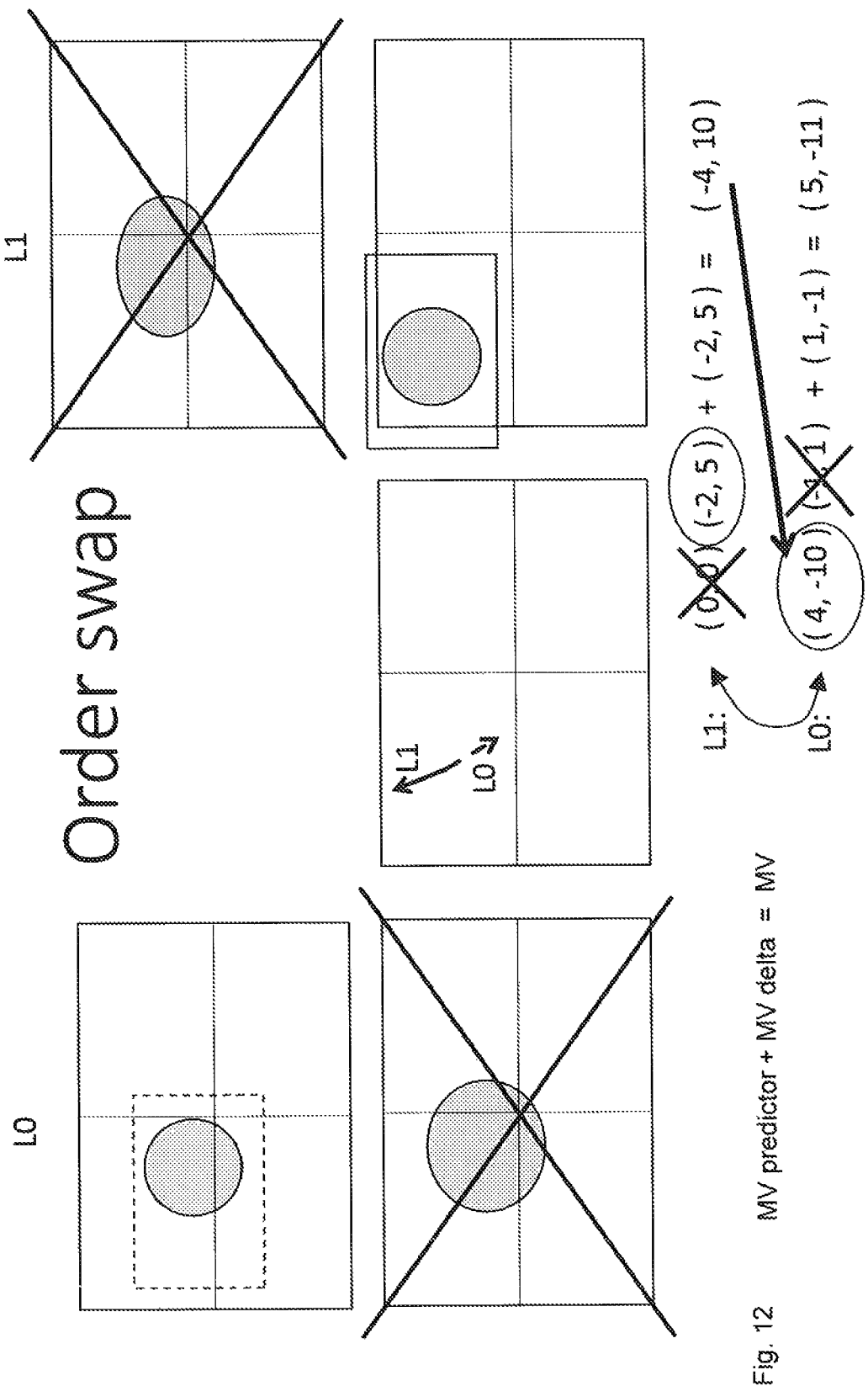
FIG. 12 shows another example of motion vector reconstruction for L0 and L1.

FIGS. 10-12 show an example of the reconstruction order and replacement solutions presented herein. First, FIG. 10 shows the L0 and L1 motion vector predictor lists, where the motion vectors for each list are reconstructed using conventional techniques. The motion vector for L0 is reconstructed by first selecting one of two candidate motion vector predictors and adding a first motion vector delta (5, −11). Then, the motion vector for L1 is reconstructed by selecting one of two candidate motion vector predictor and adding a second motion vector delta (−2, 5). FIG. 11 shows how the replacement embodiment, e.g., of FIG. 5, can be used to improve the reconstruction process by replacing a less reliable candidate motion vector predictor in L1 with the reconstructed motion vector for L0. The replaced candidate motion vector predictor enables a smaller delta value, e.g., (1, −1) to be used when reconstructing the motion vector for L1. FIG. 12 shows how the reconstruction order embodiment, e.g., of FIGS. 4 and 8, can be used to improve the reconstruction process. Here, the motion vector for L1 is reconstructed before the motion vector for L0. In the example of FIG. 12, it is beneficial to reconstruct L1 before L0 because L1 has a better prediction candidate that only requires the sending of the delta motion vector (−2, 5) instead of the longer delta motion vector (5, −11) (see FIG. 10) in addition to the delta motion vector for the other list, which is (1, −1) for both cases.

Thus, the prior art solution shown in FIG. 10 in which list L0 is always processed first followed by list L1 and in which there is no replacement of candidate motion vector predictors, the motion vector deltas will be (5, −11) and (−2, 5). In the solution shown in FIG. 11, the list L0 is always processed first followed by list L1 but a candidate motion vector predictor in list L1 can be replaced by the reconstructed motion vector or a scaled version thereof for list L0. This results, in the current example, in motion vector deltas (5, −11) and (1, −1). Thus, a smaller motion vector delta is obtained for list L1 as compared to the situation in FIG. 10. However, this solution has no effect on the motion vector delta of list L0 which still is (5, −11). In the embodiment of the invention as shown in FIG. 12, the order of processing lists L0 and L1 is not fixed as in FIGS. 10 and 11. This means that list L1 can be processed prior to list L0 as shown in the figure. Accordingly, the reconstructed motion vector for the list L1, or rather a scaled version thereof, can be used as candidate motion vector predictor for list L0 and thereby result in a smaller motion vector delta of (1, −1) instead of (5, −11).

The embodiment of FIG. 12 reduces both motion vector deltas as compared to the prior art solution of FIG. 10 and reduces one of the motion vector deltas while the other remains the same as compared to the solution of FIG. 11. Hence, fewer bits are required to encode the motion vector deltas of the embodiment in FIG. 12 as compared to the solutions in FIGS. 10 and 11.

The solution presented herein improves the performance of video encoding and decoding. For example, rather than reconstructing the two motion vectors of a bi-directional block in a pre-determined order, the solution presented herein enables an order to be chosen in order to minimize coding cost. Tests show that such reordering roughly doubles the gains seen from L1fromL0 alone. In JEM (former KTA), for example, this brings gains from 0.06% to 0.14%. In JEM without template matching, the gain goes from 0.09% to 0.27%.

The details presented herein are described in terms of encoding and decoding pictures. In ITU-T recommendations, e.g. H.265, it is noted that a picture may comprise a frame or a field, but that in one coded video sequence (CVS), either all pictures are frames or all pictures are fields. It may be noted that in the art, the term "frame" is often used interchangeably with the term "picture."

An aspect of the embodiments relates to an apparatus for predicting motion vectors used for bi-prediction in video encoding of a block of a current picture in a video encoder. The apparatus is configured to determine at least one candidate motion vector predictor for each of two different motion vector predictor lists, each candidate motion vector predictor associated with a reference picture. The apparatus is also configured to select a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The apparatus is further configured to generate a first motion vector delta as a difference between a first actual motion vector for the block and a candidate motion vector predictor from the first motion vector predictor list. The apparatus is additionally configured to replace one of the at least one candidate motion vector predictor in the second motion vector predictor list with the first actual motion vector or a scaled version of the first actual motion vector. The apparatus is also configured to generate a second motion vector delta as a difference between a second actual motion vector for the block and a candidate motion vector predictor from the second motion vector predictor list.

In an embodiment, the apparatus is configured to determine the at least one candidate motion vector predictor at least partly based on an actual motion vector of a neighboring, previously encoded block in the current picture or a scaled version of the actual motion vector.

In an embodiment, the apparatus is configured to generate the second motion vector delta as a difference between the second actual motion vector and the candidate motion vector predictor equal to the first actual motion vector or the scaled version of the first actual motion vector.

In an embodiment, the apparatus is configured to scale the first actual motion vector to obtain the scaled version of the first actual motion vector with a scalar value defined based on a distance in output order between the current picture and a reference picture associated with the first actual motion vector and a distance in output order between the current picture and a reference picture associated with the second actual motion vector.

In an embodiment, the apparatus is configured to determine whether one of the at least one candidate motion vector predictor in the second motion vector predictor list was previously scaled by a scalar value. In this embodiment, the apparatus is also configured to replace the previously scaled candidate motion vector predictor with the first actual motion vector or the scaled version of the first actual motion vector if the second motion vector predictor list includes a previously scaled candidate motion vector predictor.

In an embodiment, the apparatus is configured to generate a respective motion vector delta as a difference between an actual motion vector for the block and a respective candidate motion vector predictor. In this embodiment, the apparatus is also configured to select the reconstruction order by identifying the motion vector predictor list associated with the smallest motion vector delta value as the first motion vector predictor list.

The apparatus according to the above described embodiments is preferably implemented in or forming part of a video encoder.

Another aspect of the embodiments relates to an apparatus for reconstructing motion vectors used for bi-prediction in video decoding of a block of a current picture in a video decoder. The apparatus is configured to determine at least one candidate motion vector predictor for each of two different motion vector predictor lists, each candidate motion vector predictor associated with a reference picture. The apparatus is also configured to select a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The apparatus is further configured to generate a first reconstructed motion vector for the first motion vector predictor list using a candidate motion vector predictor of the first motion vector predictor list and a first motion vector delta retrieved from the bitstream. The apparatus is additionally configured to replace one of the at least one candidate motion vector predictor in the second motion vector predictor list with the first reconstructed motion vector or a scaled version of the first reconstructed motion vector. The apparatus is also configured to generate a second reconstructed motion vector for the second motion vector predictor list using a candidate motion vector predictor of the second motion vector predictor list and a second motion vector delta retrieved from the bitstream.

In an embodiment, the apparatus is configured to determine the at least one candidate motion vector predictor at least partly based on a reconstructed motion vector of a neighboring, previously decoded block in the current picture or a scaled version of the reconstructed motion vector.

In an embodiment, the apparatus is configured to generate the second reconstructed motion vector using the candidate motion vector predictor equal to the first reconstructed motion vector or the scaled version of the first reconstructed motion vector and the second motion vector delta.

In an embodiment, the apparatus is configured to scale the first reconstructed motion vector to obtain the scaled version of the first reconstructed motion vector with a scalar value defined based on a distance in output order between the current picture and a reference picture associated with the first motion vector delta and a distance in output order between the current picture and a reference picture associated with the second motion vector delta.

In an embodiment, the apparatus is configured to determine whether one of the at least one candidate motion vector predictor in the second motion vector predictor list was previously scaled by a scalar value. In this embodiment, the apparatus is also configured to replace the previously scaled candidate motion vector predictor with the first reconstructed motion vector or the scaled version of the first reconstructed motion vector if the second motion vector predictor list includes a previously scaled candidate motion vector predictor.

In an embodiment, the apparatus is configured to select the reconstruction for the two different motion vector predictor lists based on the candidate motion vector predictors.

The apparatus according to the above described embodiments is preferably implemented in or forming part of a video decoder.

The following described embodiments can be applied to the apparatus regardless of being implemented or forming part of a video encoder or a video decoder.

In an embodiment, the apparatus is configured to determine whether one of the motion vector predictor lists includes a template matching candidate motion vector predictor. In this embodiment, the apparatus is also configured, if one of the motion vector predictor lists includes a template matching candidate motion vector predictor, to select the reconstruction order by identifying the motion vector predictor list that includes the template matching candidate motion vector predictor as the first motion vector predictor list.

In an embodiment, the apparatus is configured to determine whether one of the motion vector predictor lists includes a candidate motion vector predictor that was previously scaled by a scalar value. In this embodiment, the apparatus is also configured to select the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the apparatus is configured to determine whether one of the motion vector predictor lists includes a template matching candidate motion vector predictor. The apparatus is also configured to determine whether one of the motion vector predictor lists includes a candidate motion vector predictor that was previously scaled by a scalar value. The apparatus is further configured, if one of the motion vector predictor lists includes a template matching candidate motion vector predictor, to select the reconstruction order by identifying the motion vector predictor list that includes the template matching candidate vector predictor as the first motion vector predictor list. The apparatus is additionally configured to otherwise select the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the apparatus is configured to identify which of the reference pictures associated with the candidate motion vector predictors of the two motion vector predictor lists is closest in display order to the current picture and defining it as a first reference picture. In this embodiment, the apparatus is also configured to select the reconstruction order by identifying the motion vector predictor list associated with the first reference picture as the first motion vector predictor list.

An embodiment relates to an apparatus for predicting motion vectors used for bi-prediction in video encoding of a block of a current picture in a video encoder. The apparatus is configured to determine at least one candidate motion vector predictor for each of a first motion vector predictor list and a second motion vector predictor list. Each candidate motion vector predictor is associated with a reference picture. The apparatus is also configured to generate a first motion vector delta as a difference between a first actual motion vector for the block and a candidate motion vector predictor from the first motion vector predictor list. The apparatus is further configured to replace one of the at least one candidate motion vector predictor in the second motion vector predictor list with the first actual motion vector or a scaled version of the first actual motion vector. The apparatus is also configured to generate a second motion vector delta as a difference between a second actual motion vector for the block and a candidate motion vector predictor from the second motion vector predictor list.

In a particular embodiment, the apparatus is configured to generate the second motion vector delta as a difference between the second actual motion vector for the block and the candidate motion vector predictor equal to the first actual motion vector or the scaled version of the first actual motion vector from the second motion vector predictor list.

Another embodiments relates to an apparatus for reconstructing motion vectors used for bi-prediction in video decoding of a block of a current picture in a video decoder. The apparatus is configured to determine at least one candidate motion vector predictor for each of a first motion vector predictor list and a second motion vector predictor list. Each candidate motion vector predictor is associated with a reference picture. The apparatus is also configured to generate a first reconstructed motion vector delta for the first motion vector predictor list using a candidate motion vector predictor of the first motion vector predictor list and a first motion vector delta retrieved from the bitstream. The apparatus is further configured to replace one of the at least one candidate motion vector predictor in the second motion vector predictor list with the first reconstructed motion vector or a scaled version of the first reconstructed motion vector. The apparatus is also configured to generate a second reconstructed motion vector delta for the second motion vector predictor list using a candidate motion vector predictor of the second motion vector predictor list and a second motion vector delta retrieved from the bitstream.

In a particular embodiment, the apparatus is configured to generate the second reconstructed motion vector delta for the second motion vector predictor list using the candidate motion vector predictor equal to the first reconstructed motion vector or the scaled version of the first reconstructed motion vector of the second motion vector predictor list and the second motion vector delta retrieved from the bitstream.

Figure 13:
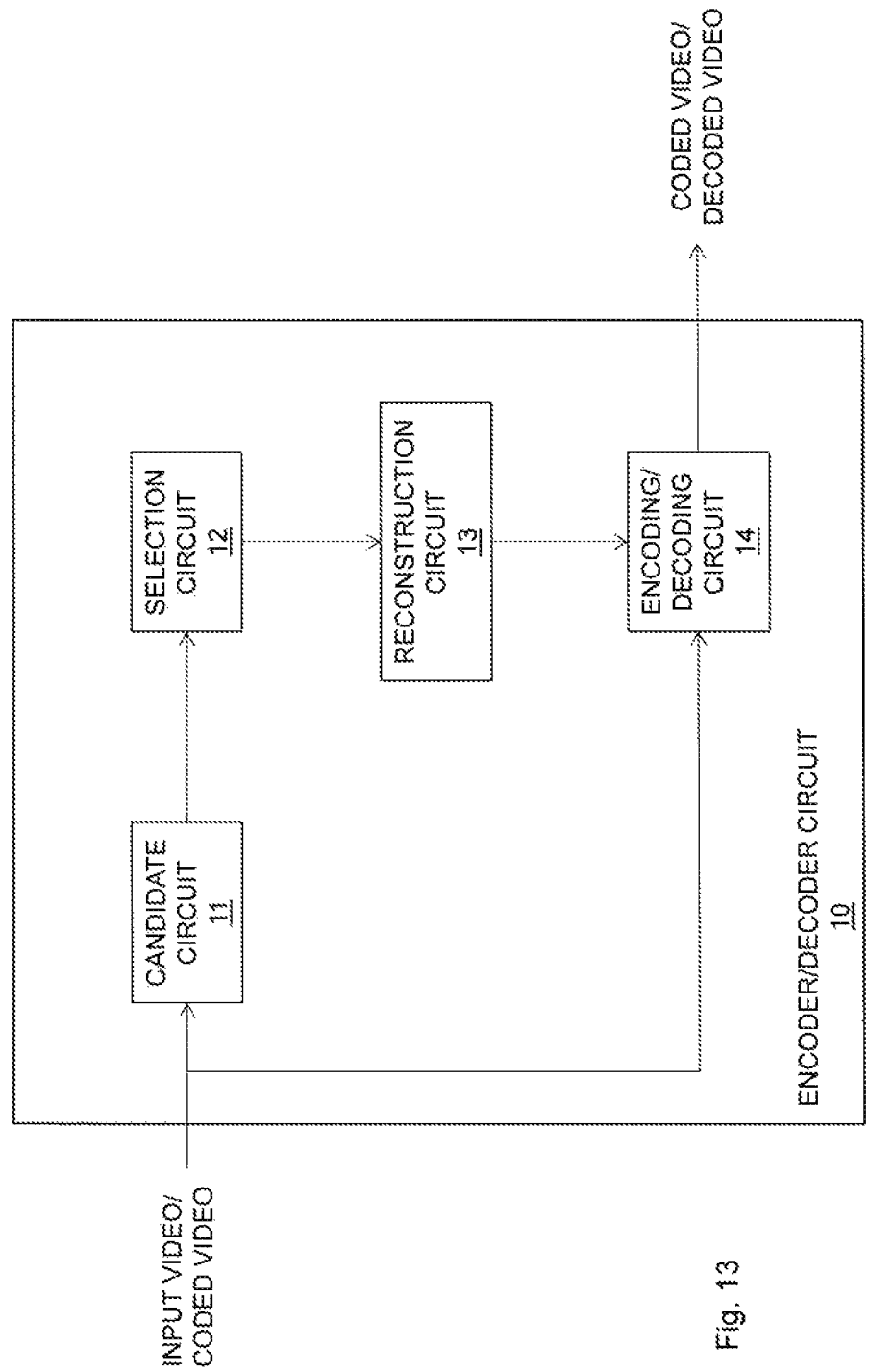
FIG. 13 shows a block diagram of an encoder/decoder circuit according to an exemplary embodiment.

FIG. 13 shows a block diagram of an exemplary video coder circuit 10, e.g., a video encoder circuit 10, which may be used to implement the method of FIG. 4. In this embodiment, the video encoder circuit 10 comprises a candidate circuit 11, a selection circuit 12, a reconstruction circuit 13, and an encoding circuit 14. For the input video, the candidate circuit 11 determines at least one candidate motion vector predictor for each of two different motion vector predictor lists, e.g., L0 and L1. The selection circuit 12 selects a reconstruction order for the motion vector predictor lists responsive to at least one characteristic of the candidate motion vector predictors. The reconstruction circuit 13 reconstructs a motion vector for each of the motion vector predictor lists according to the selected reconstruction order. In particular, the reconstruction circuit 13 first generates a first reconstructed motion vector using the at least one candidate motion vector predictor of the first motion vector predictor list, and subsequently generates a second reconstructed motion vector using the at least one candidate motion vector predictor of the second motion vector predictor list. The encoding circuit 14 encodes/decodes the block of the current picture using the first and second reconstructed motion vectors. It will be appreciated that when the video coder circuit 10 comprises a video decoder circuit 10, then circuit 14 comprises a decoding circuit 14 that decodes the block of the current picture using the first and second reconstructed motion vectors.

In one exemplary embodiment, the candidate circuit 11 determines a candidate motion vector predictor for the second motion vector predictor list using a motion vector derived from the first reconstructed motion vector, where the reconstruction circuit 13 then generates the second reconstructed motion vector using this revised list. In one embodiment, the candidate circuit 11 may replace one of the candidate motion vector predictors in the second motion vector predictor list with the first reconstructed motion vector, or a motion vector derived from the first reconstructed motion vector, e.g., a scaled version of the first reconstructed motion vector. For example, the candidate circuit 11 may determine whether the second list includes a previously scaled candidate motion vector predictor. If so, the candidate circuit 11 replaces the previously scaled predication candidate with the first reconstructed motion vector (or a motion vector derived from the first reconstructed motion vector). In another embodiment, the candidate circuit 11 may simply generate the second motion vector predictor list using the first reconstructed motion vector (or a scaled version).

The selection circuit 12 selects the reconstruction order responsive to characteristic(s) of the candidate motion vector predictors. For example, the selection circuit 12 may identify the motion vector predictor list that includes a template matching candidate motion vector predictor as the first motion vector predictor list, and the remaining motion vector predictor list as the second motion vector predictor list. In another example, the selection circuit 12 identifies the motion vector predictor list that includes a previously scaled candidate motion vector predictor as the second motion vector predictor list, and the remaining motion vector predictor list as the first motion vector predictor list. In another example, the selection circuit 12 identifies the motion vector predictor list having the candidate motion vector predictor with the largest delta value (relative to a corresponding actual motion vector) as the first motion vector predictor list, and the remaining motion vector predictor list as the second motion vector predictor list. In another example, the selection circuit 12 identifies the motion vector predictor list having the candidate motion vector predictor(s) associated with the reference picture closest in display order to the current picture as the first motion vector predictor list, and the remaining motion vector predictor list as the second motion vector predictor list.

It will be appreciated that while the solution presented herein is described in terms of two motion vector predictor lists, the solution presented herein may be used to select the reconstruction order for more than two motion vector predictor lists. For example, the selection circuit 12 may identify one of the three different motion vector predictor lists as the first motion vector predictor list, identify a different one of the three different motion vector predictor lists as the second motion vector predictor list, and identify the remaining one of the three different motion vector predictor lists as a third motion vector predictor list. The reconstruction circuit 13 then reconstructs the motion vectors according to the selected reconstruction order. It will be appreciated that this is further extendable to four or more motion vector predictor lists.

It will be appreciated that other devices may implement the method of FIG. 4. For example, the encoding/decoding apparatus 20 shown in FIG. 14 may use candidate module 21, selection module 22, reconstruction module 23, and encoding/decoding module 24 to implement method. Those of skill in the art will also readily recognize that the method described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method may be implemented using a decoding processor comprising software instructions that when run on the decoding processor cause the decoding processor to execute the method of FIG. 4.

In some embodiments, the encoder/decoder circuit or encoder/decoder apparatus is comprised in a device, including but not limited to, a tablet, personal computer, mobile telephone, set-top box, and camera.

It will be appreciated that the methods, method steps and devices, apparatus functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

FIG. 15 is a schematic block diagram illustrating an example of an apparatus for predicting/reconstructing motion vectors 100 based on a processor-memory implementation according to an embodiment. In this particular example, the apparatus 100 comprises a processor 101, such as processing circuitry, and a memory 102. The memory 102 comprises instructions executable by the processor 101.

In an embodiment, the processor 101 is operative to determine the at least one candidate motion vector predictor and select the reconstruction order. The processor 101 is also operative to generate the first motion vector delta and replace the one of the at least one candidate motion vector predictor. The processor 101 is further operative to generate the second motion vector delta.

In another embodiment, the processor 101 is operative to determine the at least one candidate motion vector predictor and select the reconstruction order. The processor 101 is also operative to generate the first reconstructed motion vector and replace the one of the at least one candidate motion vector predictor. The processor 101 is further operative to generate the second reconstructed motion vector.

Optionally, the apparatus 100 may also include a communication circuit, represented by an input/output (I/O) unit 103 in FIG. 15. The I/O unit 103 may include functions for wired and/or wireless communication with other devices and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

FIG. 16 is a schematic block diagram illustrating another example of an apparatus for predicting/reconstructing motion vectors 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 17:
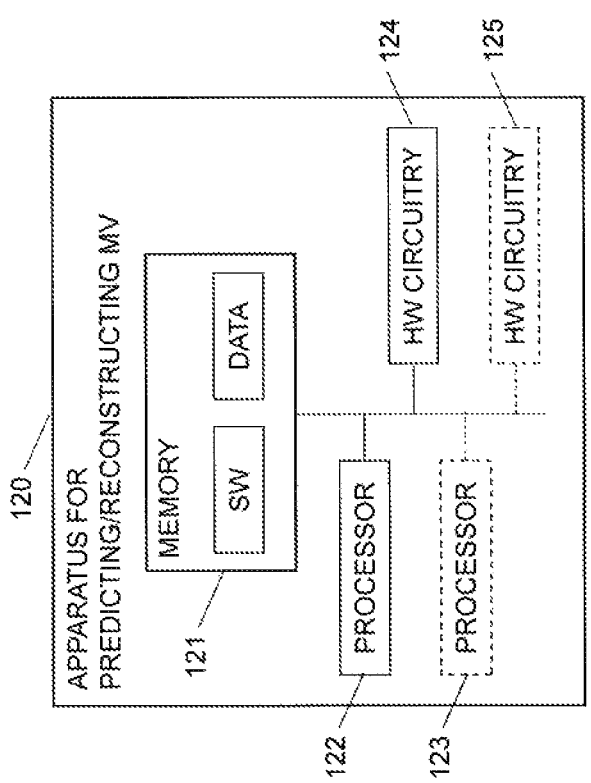
FIG. 17 shows a block diagram of an apparatus for predicting/reconstructing motion vector (MV) according to a further exemplary embodiment.

FIG. 17 is a schematic block diagram illustrating yet another example of an apparatus for predicting/reconstructing motion vectors 120 based on combination of both processor(s) 122, 123 and hardware circuitry 124, 125 in connection with suitable memory unit(s) 121. The apparatus 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 18:
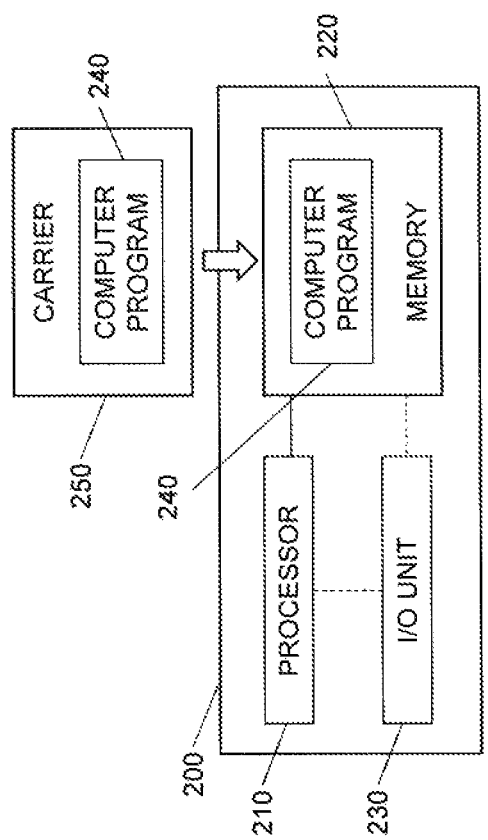
FIG. 18 shows a block diagram of a computer program based implementation of an exemplary embodiment.

FIG. 18 is a schematic diagram illustrating an example of an apparatus for predicting/reconstructing motion vectors 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as input of pictures of a video sequence or a bitstream and output of the bitstream or decoded pictures of the video sequence.

The term 'processor' should be interpreted in a general sense as any circuitry, system or device capable of executing program code or computer program instructions to perform a particular processing, determining or computing task.

The processing circuitry including one or more processors 210 is, thus, configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to determine, for a block of a current picture in a video sequence, at least one candidate motion vector predictor for each of two different motion vector predictor lists, each candidate motion vector predictor associated with a reference picture. The at least one processor 210 is also caused to select a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The at least one processor 210 is further caused to generate a first motion vector delta as a difference between a first actual motion vector for the block and a candidate motion vector predictor from the first motion vector predictor list. The at least one processor 210 is additionally caused to replace one of the at least one candidate motion vector predictor in the second motion vector predictor list with the first actual motion vector or a scaled version of the first actual motion vector. The at least one processor 210 is also caused to generate a second motion vector delta as a difference between a second actual motion vector for the block and a candidate motion vector predictor from the second motion vector predictor list.

In another particular embodiment, the computer program 240 comprises instructions, which when executed by at least one processor 210, cause the at least one processor 210 to determine, for a block of a current picture in a video sequence, at least one candidate motion vector predictor for each of two different motion vector predictor lists, each candidate motion vector predictor associated with a reference picture. The at least one processor 210 is also caused to select a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The at least one processor 210 is further caused to generate a first reconstructed motion vector for the first motion vector predictor list using a candidate motion vector predictor of the first motion vector predictor list and a first motion vector delta retrieved from the bitstream. The at least one processor 210 is additionally caused to replace one of the at least one candidate motion vector predictor in the second motion vector predictor list with the first reconstructed motion vector or a scaled version of the first reconstructed motion vector. The at least one processor 210 is also caused to generate a second reconstructed motion vector for the second motion vector predictor list using a candidate motion vector predictor of the second motion vector predictor list and a second motion vector delta retrieved from the bitstream.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium.

The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of the apparatus 200 for execution by the processing circuitry 210 thereof.

The flow diagram or diagrams presented herein may be regarded as a computer flow diagram or diagrams, when performed by one or more processors. A corresponding apparatus for predicting motion vectors may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 19:
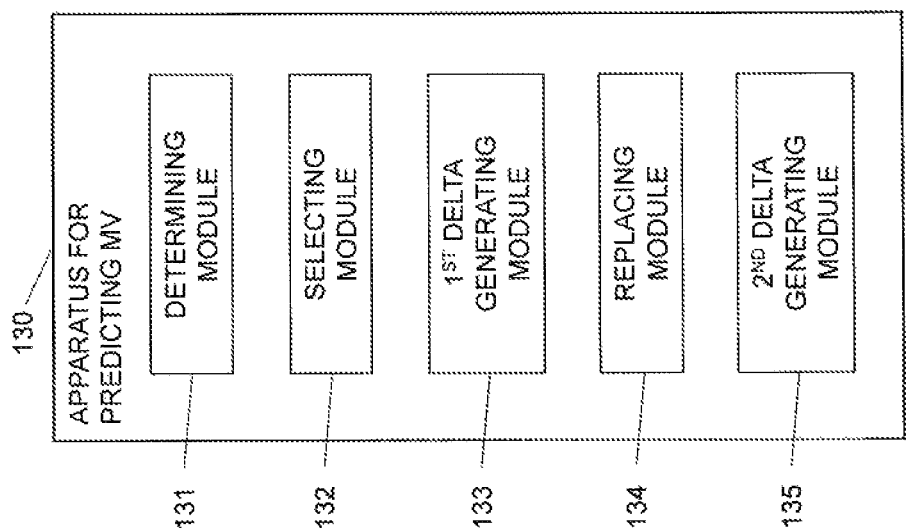
FIG. 19 shows a block diagram of an apparatus for predicting motion vector (MV) according to yet another exemplary embodiment.

FIG. 19 shows a block diagram of an apparatus for predicting motion vectors 130 used for bi-prediction in video encoding of a block of a current picture in a video encoder. The apparatus 130 comprises a determining module 131 for determining at least one candidate motion vector predictor for each of two different motion vector predictor lists, each candidate motion vector predictor associated with a reference picture. The apparatus 130 also comprises a selecting module 132 for selecting a reconstruction order for the motion vector predictor lists based on the candidate motion vector predictors. The reconstruction order identifies one of the two different motion vector predictor lists as a first motion vector predictor list and the other of the two different motion vector lists as a second motion vector predictor list. The apparatus 130 further comprises a first delta generating module 133 for generating a first motion vector delta as a difference between a first actual motion vector for the block and a candidate motion vector predictor from the first motion vector predictor list. The apparatus 130 additionally comprises a replacing module 134 for replacing one of the at least one candidate motion vector predictor in the second motion vector predictor list with the first actual motion vector or a scaled version of the first actual motion vector. The apparatus 130 also comprises a second delta generating module 135 for generating a second motion vector delta as a difference between a second actual motion vector for the block and a candidate motion vector predictor from the second motion vector predictor list.

Figure 20:
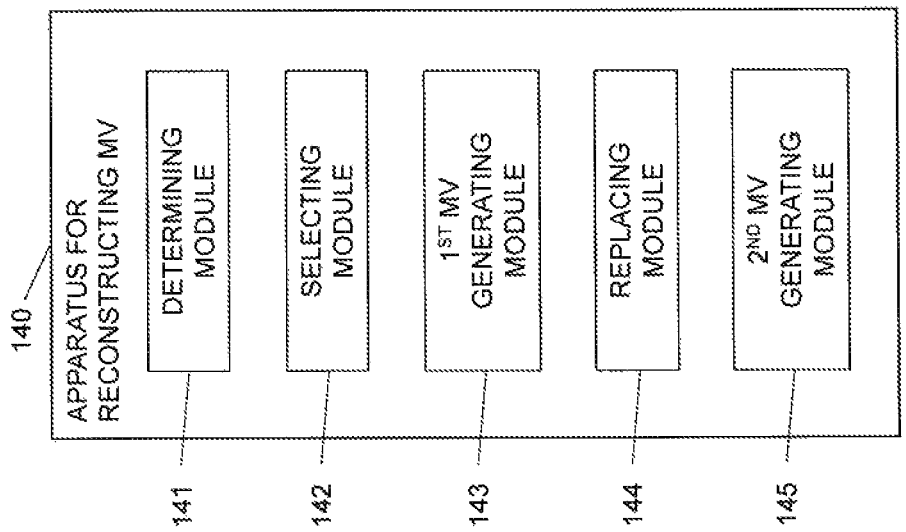
FIG. 20 shows a block diagram of an apparatus for reconstructing motion vector (MV) according to a further exemplary embodiment.

FIG. 20 shows a block diagram of an apparatus for reconstructing motion vectors 140 used for bi-prediction in video decoding of a block of a current picture in a video decoder. The apparatus 140 comprises a determining module 141 for determining at least one candidate motion vector predictor for each of two different motion vector predictor lists, each candidate motion vector predictor associated with a reference picture. The apparatus 140 also comprises a selecting module 142 for selecting a reconstruction order for two different motion vector predictor lists based on the candidate motion vector predictors or based on a syntax element retrieved from a bitstream representing an encoded version of the current picture. The reconstruction order identifies one of the two different motion vector predictor lists as a first motion vector predictor list and the other of the two different motion vector lists as a second motion vector predictor list. The apparatus 140 further comprises a first motion vector generating module 143 for generating a first reconstructed motion vector for the first motion vector predictor list using a candidate motion vector predictor of the first motion vector predictor list and a first motion vector delta retrieved from the bitstream. The apparatus 140 additionally comprises a replacing module 144 for replacing one of the at least one candidate motion vector predictor in the second motion vector predictor list with the first reconstructed motion vector or a scaled version of the first reconstructed motion vector. The apparatus 140 also comprises a second motion vector generating module 145 for generating a second reconstructed motion vector for the second motion vector predictor list using a candidate motion vector predictor of the second motion vector predictor list and a second motion vector delta retrieved from the bitstream.

An embodiment relates to a video encoder comprising an apparatus for predicting motion vectors according to the embodiments.

In an embodiment, the video encoder is configured to encode the block to form a bitstream comprising encoded presentations of the first motion vector delta and the second motion vector delta.

In an embodiment, the video encoder is configured to include, in the bitstream, a syntax element defining the selected reconstruction order.

Figure 21:
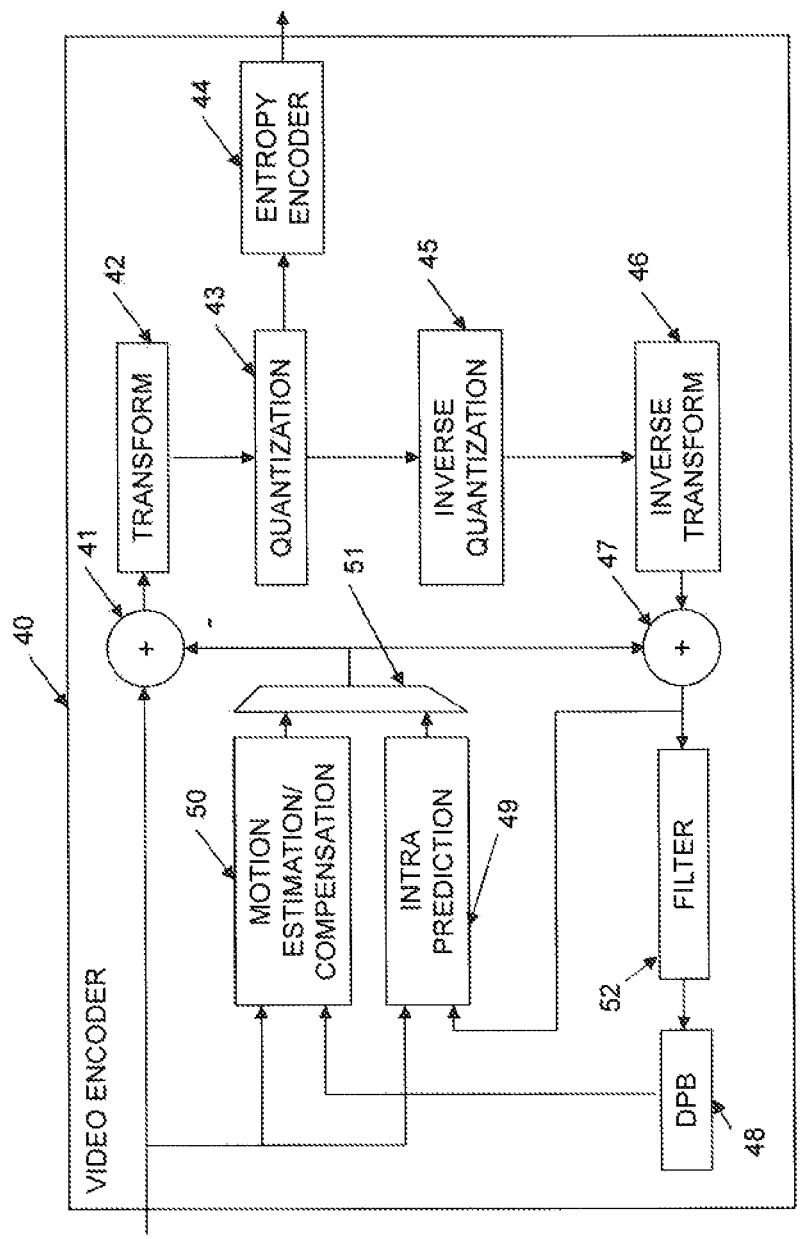
FIG. 21 shows a block diagram of a video encoder according to an exemplary embodiment.

FIG. 21 is a schematic block diagram of a video encoder 40 according to an embodiment.

A current block is predicted by performing a motion estimation by a motion estimator 50 from already encoded and reconstructed block(s) in the same picture and/or in reference picture(s). The result of the motion estimation is at least one motion vector in the case of inter prediction. The at least one motion vector is utilized by a motion compensator 50 for outputting an inter prediction of the block.

An intra predictor 49 computes an intra prediction of the current block. The outputs from the motion estimator/compensator 50 and the intra predictor 49 are input in a selector 51 that either selects intra prediction or inter prediction for the current block. The output from the selector 51 is input to an error calculator in the form of an adder 41 that also receives the pixel values of the current block. The adder 41 calculates and outputs a residual error as the difference in pixel values between the block and its prediction, i.e., reference or prediction block.

The error is transformed in a transformer 42, such as by a discrete cosine transform (DCT), and quantized by a quantizer 43 followed by coding in an encoder 44, such as by an entropy encoder. In inter coding, also the motion vector deltas are brought to the encoder 44 for generating the coded representation of the current block.

The transformed and quantized residual error for the current block is also provided to an inverse quantizer 45 and inverse transformer 46 to reconstruct the residual error. This residual error is added by an adder 47 to the prediction output from the motion compensator 50 or the intra predictor 49 to create a reconstructed block that can be used as prediction block in the prediction and coding of other blocks. This reconstructed block is typically first deblocking filtered 52. The processed reconstructed block is then temporarily stored in a Decoded Picture Buffer (DPB) 48, where it is available to the intra predictor 49 and the motion estimator/compensator 50.

An apparatus according to the present embodiment can advantageously be implemented in or as a part of the motion estimator/compensator 50 of the video encoder 40.

An embodiment relates to a video decoder comprising an apparatus for predicting motion vectors according to the embodiments.

Figure 22:
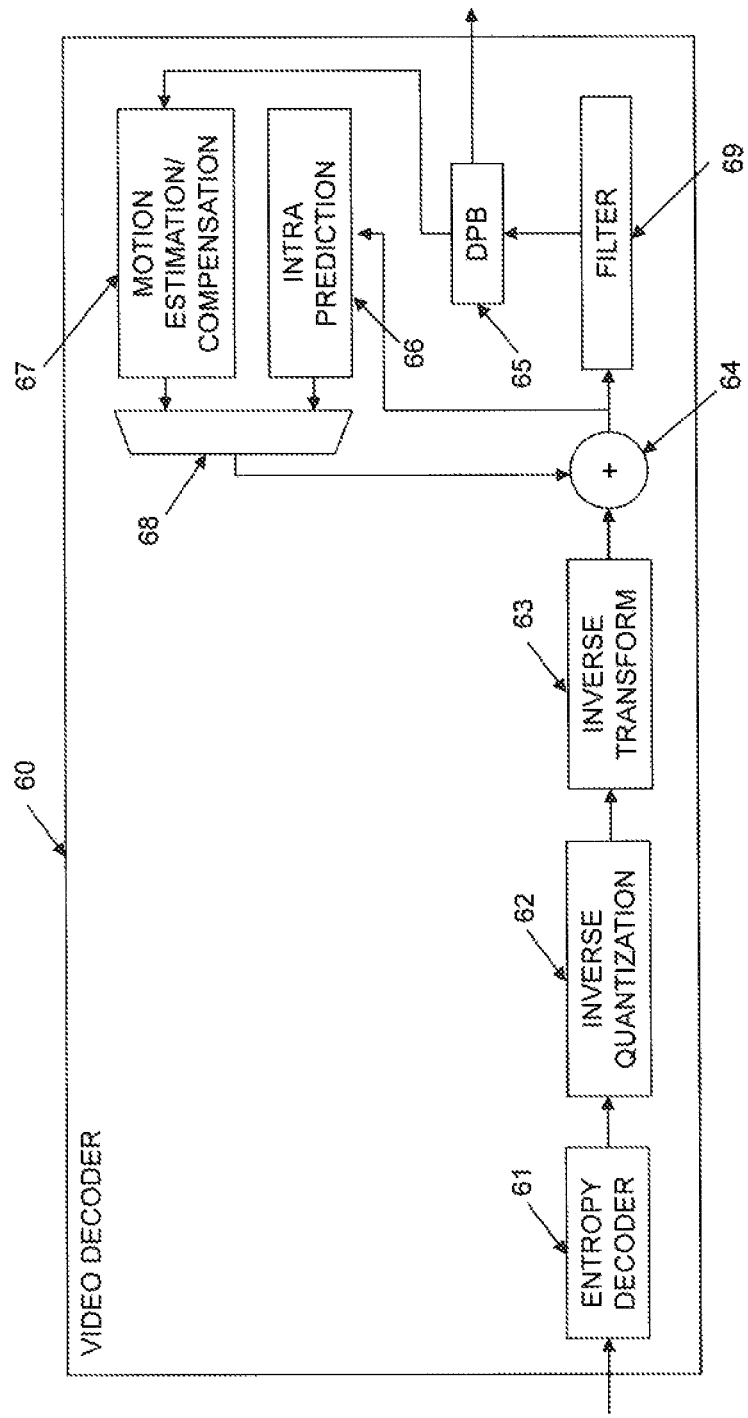
FIG. 22 shows a block diagram of a video decoder according to an exemplary embodiment.

FIG. 22 is a schematic block diagram of a video decoder 60 comprising an apparatus according to the embodiments. The video decoder 60 comprises a decoder 61, such as entropy decoder, for decoding a bitstream comprising an encoded representation of a block to get a quantized and transformed residual error. The residual error is dequantized in an inverse quantizer 62 and inverse transformed by an inverse transformer 63 to get a decoded residual error.

The decoded residual error is added in an adder 64 to the prediction values of a prediction or reference block. The prediction block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block output from the adder 64 is deblocking filtered 69. The filtered block enters a DPB 65 and can be used as prediction block for subsequently decoded sample blocks. The DPB 65 is thereby connected to the motion estimator/compensator 67 to make the stored blocks available to the motion estimator/compensator 67. The output from the adder 64 is preferably also input to the intra predictor 66 to be used as an unfiltered prediction block. The filtered block is furthermore output from the video decoder 60, such as output for display on a screen.

An apparatus according to the present embodiment can advantageously be implemented in or as a part of the motion estimator/compensator 67 of the video decoder 60.

A further embodiment relates to a user equipment or device comprising a video encoder and/or a video decoder according to the embodiments. In a particular embodiment, the user equipment is selected from a group consisting of a video camera, a computer, a personal computer, a laptop, a smart phone, a mobile telephone, a tablet, a lap top, a desktop, a notebook, a personal video recorder, a multimedia player, a TV, a game console and a set-top box.

Figure 23:
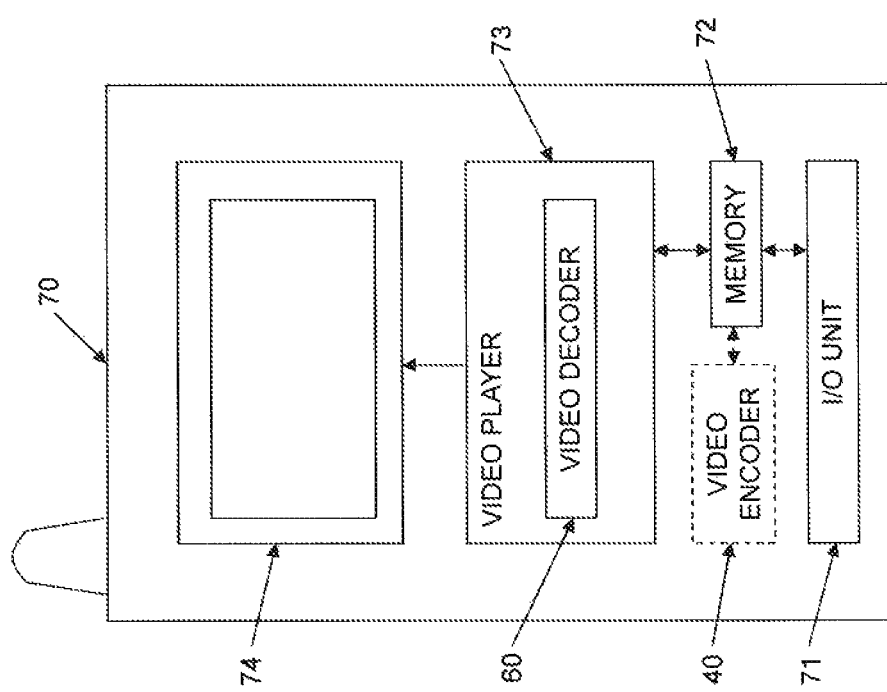
FIG. 23 shows a block diagram of a user equipment according to an exemplary embodiment.

FIG. 23 is a schematic block diagram of a user equipment 70 housing a video decoder 60 with an apparatus for prediction motion vectors. The user equipment 70 can be any device having video decoding functions that operates on an encoded bitstream to thereby decode the bitstream and make the video sequence available for display on a screen 74.

The user equipment 70 comprises a memory 72 configured to store encoded video data. The encoded video data can have been generated by the user equipment 70 itself. Alternatively, the encoded video data is generated by some other device and wirelessly transmitted or transmitted by wire to the user equipment 70. The user equipment 70 then comprises a transceiver (transmitter and receiver) or I/O unit 71 to achieve the data transfer.

The encoded video data is brought from the memory 72 to a video decoder 60, such as the video decoder illustrated in FIG. 22. The video decoder 60 then decodes the encoded video data into decoded pictures. The decoded pictures are provided to a video player 73 that is configured to play out the decoded pictures as a video sequence on a screen 74 of or connected to the user equipment 70.

In FIG. 23, the user equipment 70 has been illustrated as comprising both the video decoder 60 and the video player 73, with the video decoder 60 implemented as a part of the video player 73. This should, however, merely be seen as an illustrative but non-limiting example of an implementation embodiment for the user equipment 70. Also distributed implementations are possible where the video decoder 60 and the video player 73 are provided in two physically separated devices are possible and within the scope of user equipment 70 as used herein. The screen 74 could also be provided as a separate device connected to the user equipment 70, where the actual data processing is taking place.

The user equipment 70 may also, or alternatively, comprise a video encoder 40, such as the video encoder of FIG. 21, comprising an apparatus for predicting motion vectors. The video encoder 40 is then configured to encode pictures received by the I/O unit 71 and/or generated by the user equipment 70 itself. In the latter case, the user equipment 70 preferably comprises a video engine or video recorder, such as in the form of or connected to a video camera.

The video encoder and/or video decoder of the embodiments may alternatively be implemented in a network device or equipment being or belonging to a network node in a communication network. Such a network device may be a device for converting video according to one video coding standard to another video coding standard, i.e., transcoding. The network equipment can be in the form of or comprised in a radio base station, a Node-B, evolved Node-B, or any other network node in a communication network, such as a radio-based network.

It is becoming increasingly popular to provide computing services, hardware and/or software, in network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 24:
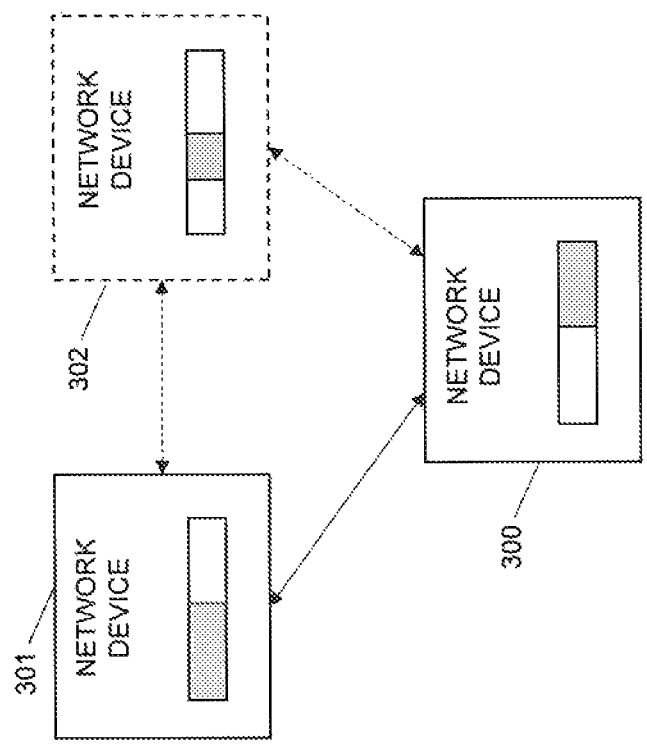
FIG. 24 schematically illustrates a distributed implementation among network devices.

FIG. 24 is a schematic diagram illustrating an example of how functionality can be distributed or partitioned between different network devices in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless or wired communication system, or one or more of the network devices may be so-called cloud-based network devices located outside of the wireless or wired communication system.

Figure 25:
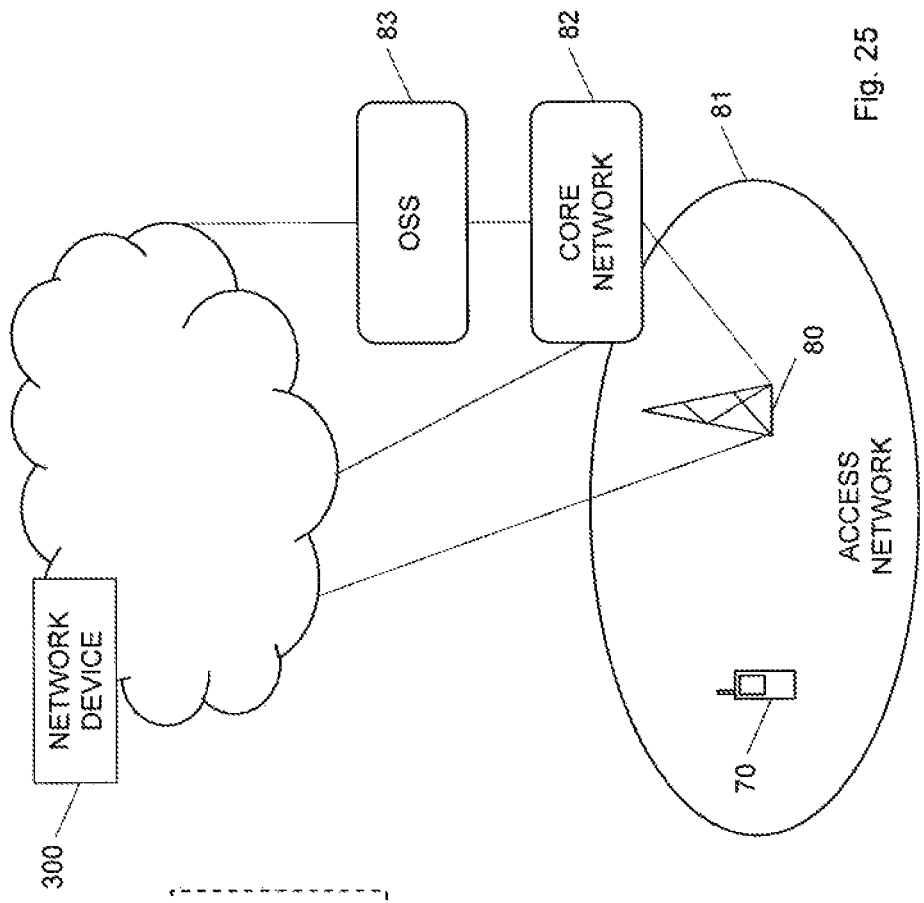
FIG. 25 is a schematic illustration of an example of a wireless communication system with one or more cloud-based network devices according to an embodiment.

FIG. 25 is a schematic diagram illustrating an example of a wireless communication network or system, including an access network 81 and a core network 82 and optionally an operations and support system (OSS) 83 in cooperation with one or more cloud-based network devices 300. The figure also illustrates a user equipment 70 connected to the access network 81 and capable of conducting wireless communication with a base station representing an embodiment of a network node 80.

Here below, various embodiments are further described.

An embodiment relates to a method for predicting motion vectors used for bi-prediction in video encoding of a block of a current picture in a video encoder. The method comprises determining at least one candidate motion vector predictor for each of two different motion vector predictor lists, each candidate motion vector predictor associated with a reference picture. The method comprises selecting a reconstruction order for the motion vector predictor lists responsive to at least one characteristic of the candidate motion vector predictors. The reconstruction order identifies one of the two different motion vector predictor lists as a first motion vector predictor list and the other of the two different vector lists as a second motion vector predictor list. The method comprises reconstructing a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The method comprises encoding the block of the current picture using the first and second reconstructed motion vectors.

Another embodiment relates to a method for predicting motion vectors used for bi-prediction in video encoding of a block of a current picture in a video encoder. The method comprises determining at least one candidate motion vector predictor for each of two different motion vector predictor lists, each candidate motion vector predictor associated with a reference picture. The method comprises selecting a reconstruction order for the motion vector predictor lists responsive to at least one characteristic of the candidate motion vector predictors. The reconstruction order identifies one of the two different motion vector predictor lists as a first motion vector predictor list and the other of the two different vector lists as a second motion vector predictor list. The method comprises generating a motion vector delta for each of the motion vector predictor lists according to the selected reconstruction order by first generating a first motion vector delta using the at least one candidate motion vector predictor of the first motion vector predictor list, and subsequently generating a second motion vector delta using the at least one candidate motion vector predictor of the second motion vector predictor list. The method comprises encoding the block of the current picture including the first and second motion vector deltas.

In an embodiment, determining the at least one candidate motion vector predictor for the second motion vector predictor list comprises determining the at least one candidate motion vector predictor using a motion vector derived from the first reconstructed motion vector before generating the second reconstructed motion vector.

In an embodiment, determining the at least one candidate motion vector predictor using a motion vector derived from the first reconstructed motion vector comprises replacing one of the candidate motion vector predictors in the second motion vector predictor list with the motion vector derived from the first reconstructed motion vector before generating the second reconstructed motion vector.

In an embodiment, replacing one of the candidate motion vector predictors in the second motion vector predictor list comprises determining whether one of the candidate motion vector predictors in the second motion vector predictor list was previously scaled by a scalar value and, if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the method comprises signaling, to a video decoder, that the motion vector reconstruction order is swapped.

In an embodiment, selecting the reconstruction order comprises determining whether one of the motion vector predictor lists includes a template matching candidate motion vector predictor, and, if one of the motion vector predictor lists includes a template matching candidate motion vector predictor, selecting the reconstruction order by identifying the motion vector predictor list that includes the template matching candidate motion vector predictor as the first motion vector predictor list.

In an embodiment, selecting the reconstruction order comprises determining which of the motion vector predictor lists includes a candidate motion vector predictor that was previously scaled by a scalar value, and selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, selecting reconstruction order comprises determining whether one of the motion vector predictor lists includes a template matching candidate motion vector predictor and determining whether one of the motion vector predictor lists includes a candidate motion vector predictor that was previously scaled by a scalar value. The selecting also comprises, if one of the motion vector predictor lists includes a template matching candidate motion vector predictor, selecting the reconstruction order by identifying the motion vector predictor list that includes the template matching candidate vector predictor as the first motion vector predictor list and otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, selecting the reconstruction order comprises determining a delta value for each of the candidate motion vector predictors relative to a corresponding actual motion vector, and selecting the reconstruction order by identifying the motion vector predictor list associated with the largest delta value as the first motion vector predictor list.

In an embodiment, selecting the reconstruction order comprises identifying which of the reference pictures associated with the selected candidate motion vector predictors of the two motion vector predictor lists is closest in display order to the current picture and define it as a first reference picture and selecting the reconstruction order by identifying the motion vector predictor list associated with the first reference picture as the first motion vector predictor list.

In an embodiment, determining the at least one candidate motion vector predictor comprises determining at least one candidate motion vector predictor for each of three different motion vector predictor lists, each motion vector predictor list associated with a reference picture. In this embodiment, selecting the reconstruction order comprises selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, reconstructing the motion vector for each of the motion vector predictor lists according to the selected reconstruction order further comprises, after generating the second reconstructed motion vector, generating a third reconstructed motion vector from the third motion vector predictor list using the at least one candidate motion vector predictor of the third motion vector predictor list. In this embodiment, encoding the block of the current picture comprises encoding the block of the current picture using the first, second, and third reconstructed motion vectors.

An embodiment relates to a computer program product stored in a non-transitory computer readable medium for controlling the prediction of motion vectors used for bi-prediction in video encoding of a block of a current picture in a video encoder. The computer program product comprising software instructions that, when run on a processing circuit in the video encoder, causes the processing circuit to:

determine at least one candidate motion vector predictor for each of two different motion vector predictor lists, each motion vector predictor list associated with a reference picture;

select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list;

reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list; and encode the block of the current picture using the first and second reconstructed motion vectors.

In an embodiment, the software instructions, when run on the processing circuit in the video encoder, cause the processing circuit to determine the at least one candidate motion vector predictor for the second motion vector predictor list by determining the at least one candidate motion vector predictor using a motion vector derived from the first reconstructed motion vector before generating the second reconstructed motion vector.

In an embodiment, the software instructions, when run on the processing circuit in the video encoder, cause the processing circuit to determine the at least one candidate motion vector predictor using the motion vector derived from the first reconstructed motion vector by replacing one of the candidate motion vector predictors in the second motion vector predictor list with the motion vector derived from the first reconstructed motion vector before the generation of the second reconstructed motion vector.

An embodiment relates to an apparatus for predicting motion vectors used for bi-prediction in video encoding of a block of a current picture in a video encoder circuit. The apparatus comprises a candidate circuit configured to determine at least one candidate motion vector predictor for each of two different motion vector predictor lists, each motion vector predictor associated with a reference picture. The apparatus comprises a selection circuit configured to select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list. The apparatus comprises a reconstruction circuit configured to reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The apparatus comprises an encoding circuit configured to encode the block of the current picture using the first and second reconstructed motion vectors.

In an embodiment, the candidate circuit determines the at least one candidate motion vector predictor for the second motion vector predictor list by determining the at least one candidate motion vector predictor using a motion vector derived from the first reconstructed motion vector before generating the second reconstructed motion vector.

In an embodiment, the candidate circuit determines the at least one candidate motion vector predictor using the motion vector derived from the first reconstructed motion vector by replacing one of the candidate motion vector predictors in the second motion vector predictor list with the motion vector derived from the first reconstructed motion vector before the reconstruction circuit generates the second reconstructed motion vector.

In an embodiment, the candidate circuit replaces one of the candidate motion vector predictors in the second motion vector predictor list by:

determining whether one of the candidate motion vector predictors in the second motion vector predictor list was previously scaled by a scalar value; and if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the reconstruction circuit is further configured to signal, to a video decoder, that the motion vector reconstruction order is swapped.

In an embodiment, the selection circuit selects the reconstruction order by:

determining whether one of the motion vector predictor lists includes a template matching candidate motion vector predictor; and if one of motion vector predictor lists includes a template matching candidate motion vector predictor, selecting the reconstruction order by identifying the motion vector predictor list that includes the template matching candidate motion vector predictor as the first motion vector predictor list.

In an embodiment, the selection circuit selects the reconstruction order by:

determining which of the motion vector predictor lists includes a candidate motion vector predictor that was previously scaled by a scalar value; and selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection circuit selects the reconstruction order by:
- determining whether one of the motion vector predictor lists includes a template matching candidate motion vector predictor;
- determining whether one of the motion vector predictor lists includes a candidate motion vector predictor that was previously scaled by a scalar value;
- if one of the motion vector predictor lists includes a template matching candidate motion vector predictor, selecting the reconstruction order by identifying the motion vector predictor list that includes the template matching candidate vector predictor as the first motion vector predictor list; and
- otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection circuit selects the reconstruction order by:
- determining a delta value for each of the candidate motion vector predictors relative to a corresponding actual motion vector; and
- selecting the reconstruction order by identifying the motion vector predictor list associated with the largest delta value as the first motion vector predictor list.

In an embodiment, the selection circuit selects the reconstruction order by:
- identifying which of the reference pictures associated with the selected candidate motion vector predictors of the two motion vector predictor lists is closest in display order to the current picture and define it as a first reference picture; and
- selecting the reconstruction order by identifying the motion vector predictor list associated with the first reference picture as the first motion vector predictor list.

In an embodiment, the candidate circuit is further configured to determine the at least one candidate motion vector predictor by determining at least one candidate motion vector predictor for each of three different motion vector predictor lists, each motion vector predictor list associated with a reference picture. In this embodiment, the selection circuit is configured to select the reconstruction order by selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, the reconstruction circuit is configured to reconstruct the motion vector for each of the motion vector predictor lists according to the selected reconstruction order further by, after generating the second reconstructed motion vector, generating a third reconstructed motion vector for the third motion vector predictor list using the at least one candidate motion vector predictor of the third motion vector predictor list. In this embodiment, the encoding circuit is configured to encode the block of the current picture by encoding the block of the current picture using the first, second, and third reconstructed motion vectors.

An embodiment relates to an apparatus for predicting motion vectors used for bi-prediction in video encoding of a block of a current picture in a video encoder module. The apparatus comprises a candidate module configured to determine at least one candidate motion vector predictor for each of two different motion vector predictor lists, each motion vector predictor associated with a reference picture. The apparatus comprises a selection module configured to select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list. The apparatus comprises a reconstruction module configured to reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The apparatus comprises an encoding module configured to encode the block of the current picture using the first and second reconstructed motion vectors.

In an embodiment, the candidate module determines the at least one candidate motion vector predictor for the second motion vector predictor list by determining the at least one candidate motion vector predictor using a motion vector derived from the first reconstructed motion vector before generating the second reconstructed motion vector.

In an embodiment, the candidate module determines the at least one candidate motion vector predictor using the motion vector derived from the first reconstructed motion vector by replacing one of the candidate motion vector predictors in the second motion vector predictor list with the motion vector derived from the first reconstructed motion vector before the reconstruction circuit generates the second reconstructed motion vector.

In an embodiment, the candidate module replaces one of the candidate motion vector predictors in the second motion vector predictor list by:
- determining whether one of the candidate motion vector predictors in the second motion vector predictor list was previously scaled by a scalar value; and
- if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the reconstruction module is further configured to signal, to a video decoder, that the motion vector reconstruction order is swapped.

In an embodiment, the selection module selects the reconstruction order by:
- determining whether one of the motion vector predictor lists includes a template matching candidate motion vector predictor; and
- if one of motion vector predictor lists includes a template matching candidate motion vector predictor, selecting the reconstruction order by identifying the motion vector predictor list that includes the template matching candidate motion vector predictor as the first motion vector predictor list.

In an embodiment, the selection module selects the reconstruction order by:
- determining which of the motion vector predictor lists includes a candidate motion vector predictor that was previously scaled by a scalar value; and
- selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection module selects the reconstruction order by:
- determining whether one of the motion vector predictor lists includes a template matching candidate motion vector predictor;
- determining whether one of the motion vector predictor lists includes a candidate motion vector predictor that was previously scaled by a scalar value;
- if one of the motion vector predictor lists includes a template matching candidate motion vector predictor, selecting the reconstruction order by identifying the motion vector predictor list that includes the template matching candidate vector predictor as the first motion vector predictor list; and
- otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection module selects the reconstruction order by:
- determining a delta value for each of the candidate motion vector predictors relative to a corresponding actual motion vector; and
- selecting the reconstruction order by identifying the motion vector predictor list associated with the largest delta value as the first motion vector predictor list.

In an embodiment, the selection module selects the reconstruction order by:
- identifying which of the reference pictures associated with the selected candidate motion vector predictors of the two motion vector predictor lists is closest in display order to the current picture and define it as a first reference picture; and
- selecting the reconstruction order by identifying the motion vector predictor list associated with the first reference picture as the first motion vector predictor list.

In an embodiment, the candidate module is further configured to determine the at least one candidate motion vector predictor by determining at least one candidate motion vector predictor for each of three different motion vector predictor lists, each motion vector predictor list associated with a reference picture. In this embodiment, the selection module is configured to select the reconstruction order by selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, the reconstruction module is configured to reconstruct the motion vector for each of the motion vector predictor lists according to the selected reconstruction order further by, after generating the second reconstructed motion vector, generating a third reconstructed motion vector for the third motion vector predictor list using the at least one candidate motion vector predictor of the third motion vector predictor list. In this embodiment, the encoding module is configured to encode the block of the current picture by encoding the block of the current picture using the first, second, and third reconstructed motion vectors.

An embodiment relates to a method for predicting motion vectors used for bi-prediction in video decoding of a block of a current picture in a video decoder. The method comprises determining at least one candidate motion vector predictor for each of two different motion vector predictor lists, each candidate motion vector predictor associated with a reference picture. The method comprises selecting a reconstruction order for the motion vector predictor lists responsive to at least one characteristic of the candidate motion vector predictors. The reconstruction order identifies one of the two different motion vector predictor lists as a first motion vector predictor list and the other of the two different vector lists as a second motion vector predictor list. The method comprises reconstructing a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The method comprises decoding the block of the current picture using the first and second reconstructed motion vectors.

In an embodiment, determining the at least one candidate motion vector predictor for the second motion vector predictor list comprises determining the at least one candidate motion vector predictor using a motion vector derived from the first reconstructed motion vector before generating the second reconstructed motion vector.

In an embodiment, determining the at least one candidate motion vector predictor using a motion vector derived from the first reconstructed motion vector comprises replacing one of the candidate motion vector predictors in the second motion vector predictor list with the motion vector derived from the first reconstructed motion vector before generating the second reconstructed motion vector.

In an embodiment, replacing one of the candidate motion vector predictors in the second motion vector predictor list comprises determining whether one of the candidate motion vector predictors in the second motion vector predictor list was previously scaled by a scalar value and, if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the method comprises receiving signaling, from a video encoder, that the motion vector reconstruction order is swapped.

In an embodiment, selecting the reconstruction order comprises determining whether one of the motion vector predictor lists includes a template matching candidate motion vector predictor and, if one of the motion vector predictor lists includes a template matching candidate motion vector predictor, selecting the reconstruction order by identifying the motion vector predictor list that includes the template matching candidate motion vector predictor as the first motion vector predictor list.

In an embodiment, selecting the reconstruction order comprises determining which of the motion vector predictor lists includes a candidate motion vector predictor that was previously scaled by a scalar value and selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, selecting reconstruction order comprises determining whether one of the motion vector predictor lists includes a template matching candidate motion vector predictor and determining whether one of the motion vector predictor lists includes a candidate motion vector predictor that was previously scaled by a scalar value. In this embodiment, selecting reconstruction order comprises, if one of the motion vector predictor lists includes a template matching candidate motion vector predictor, selecting the reconstruction order by identifying the motion vector predictor list that includes the template matching candidate vector predictor as the first motion vector predictor list and otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, selecting the reconstruction order comprises determining a delta value for each of the candidate motion vector predictors relative to a corresponding actual motion vector and selecting the reconstruction order by identifying the motion vector predictor list associated with the largest delta value as the first motion vector predictor list.

In an embodiment, selecting the reconstruction order comprises identifying which of the reference pictures associated with the selected candidate motion vector predictors of the two motion vector predictor lists is closest in display order to the current picture and define it as a first reference picture and selecting the reconstruction order by identifying the motion vector predictor list associated with the first reference picture as the first motion vector predictor list.

In an embodiment, determining the at least one candidate motion vector predictor comprises determining at least one candidate motion vector predictor for each of three different motion vector predictor lists, each motion vector predictor list associated with a reference picture. In this embodiment, selecting the reconstruction order comprises selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, reconstructing the motion vector for each of the motion vector predictor lists according to the selected reconstruction order further comprises, after generating the second reconstructed motion vector, generating a third reconstructed motion vector from the third motion vector predictor list using the at least one candidate motion vector predictor of the third motion vector predictor list. In this embodiment, decoding the block of the current picture comprises decoding the block of the current picture using the first, second, and third reconstructed motion vectors.

An embodiment relates to a computer program product stored in a non-transitory computer readable medium for controlling the prediction of motion vectors used for bi-prediction in video decoding of a block of a current picture in a video decoder. The computer program product comprising software instructions that, when run on a processing circuit in the video decoder, causes the processing circuit to:
 determine at least one candidate motion vector predictor for each of two different motion vector predictor lists, each motion vector predictor list associated with a reference picture;
 select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list;
 reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list; and
 decode the block of the current picture using the first and second reconstructed motion vectors.

In an embodiment, the software instructions, when run on the processing circuit in the video decoder, cause the processing circuit to determine the at least one candidate motion vector predictor for the second motion vector predictor list by determining the at least one candidate motion vector predictor using a motion vector derived from the first reconstructed motion vector before generating the second reconstructed motion vector.

In an embodiment, the software instructions, when run on the processing circuit in the video decoder, cause the processing circuit to determine the at least one candidate motion vector predictor using the motion vector derived from the first reconstructed motion vector by replacing one of the candidate motion vector predictors in the second motion vector predictor list with the motion vector derived from the first reconstructed motion vector before the generation of the second reconstructed motion vector.

An embodiment relates to an apparatus for predicting motion vectors used for bi-prediction in video decoding of a block of a current picture in a video decoder circuit. The apparatus comprises a candidate circuit configured to determine at least one candidate motion vector predictor for each of two different motion vector predictor lists, each motion vector predictor associated with a reference picture. The apparatus comprises a selection circuit configured to select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list. The apparatus comprises a reconstruction circuit configured to reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The apparatus comprises a decoding circuit configured to decode the block of the current picture using the first and second reconstructed motion vectors.

In an embodiment, the candidate circuit determines the at least one candidate motion vector predictor for the second motion vector predictor list by determining the at least one candidate motion vector predictor using a motion vector derived from the first reconstructed motion vector before generating the second reconstructed motion vector.

In an embodiment, the candidate circuit determines the at least one candidate motion vector predictor using the motion vector derived from the first reconstructed motion vector by replacing one of the candidate motion vector predictors in the second motion vector predictor list with the motion vector derived from the first reconstructed motion vector before the reconstruction circuit generates the second reconstructed motion vector.

In an embodiment, the candidate circuit replaces one of the candidate motion vector predictors in the second motion vector predictor list by:
  determining whether one of the candidate motion vector predictors in the second motion vector predictor list was previously scaled by a scalar value; and
  if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the reconstruction circuit is further configured to receive a signal, from a video encoder, that the motion vector reconstruction order is swapped.

In an embodiment, the selection circuit selects the reconstruction order by:
  determining whether one of the motion vector predictor lists includes a template matching candidate motion vector predictor; and
  if one of motion vector predictor lists includes a template matching candidate motion vector predictor, selecting the reconstruction order by identifying the motion vector predictor list that includes the template matching candidate motion vector predictor as the first motion vector predictor list.

In an embodiment, the selection circuit selects the reconstruction order by:
  determining which of the motion vector predictor lists includes a candidate motion vector predictor that was previously scaled by a scalar value; and
  selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection circuit selects the reconstruction order by:
  determining whether one of the motion vector predictor lists includes a template matching candidate motion vector predictor;
  determining whether one of the motion vector predictor lists includes a candidate motion vector predictor that was previously scaled by a scalar value;
  if one of the motion vector predictor lists includes a template matching candidate motion vector predictor, selecting the reconstruction order by identifying the motion vector predictor list that includes the template matching candidate vector predictor as the first motion vector predictor list; and
  otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection circuit selects the reconstruction order by:
  determining a delta value for each of the candidate motion vector predictors relative to a corresponding actual motion vector; and
  selecting the reconstruction order by identifying the motion vector predictor list associated with the largest delta value as the first motion vector predictor list.

In an embodiment, the selection circuit selects the reconstruction order by:
  identifying which of the reference pictures associated with the selected candidate motion vector predictors of the two motion vector predictor lists is closest in display order to the current picture and define it as a first reference picture; and
  selecting the reconstruction order by identifying the motion vector predictor list associated with the first reference picture as the first motion vector predictor list.

In an embodiment, the candidate circuit is further configured to determine the at least one candidate motion vector predictor by determining at least one candidate motion vector predictor for each of three different motion vector predictor lists, each motion vector predictor list associated with a reference picture. In this embodiment, the selection circuit is configured to select the reconstruction order by selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, the reconstruction circuit is configured to reconstruct the motion vector for each of the motion vector predictor lists according to the selected reconstruction order further by, after generating the second reconstructed motion vector, generating a third reconstructed motion vector for the third motion vector predictor list using the at least one candidate motion vector predictor of the third motion vector predictor list. In this embodiment, the decoding circuit is configured to decode the block of the current picture by decoding the block of the current picture using the first, second, and third reconstructed motion vectors.

An embodiment relates to an apparatus for predicting motion vectors used for bi-prediction in video decoding of a block of a current picture in a video decoder module. The apparatus comprises a candidate module configured to determine at least one candidate motion vector predictor for each of two different motion vector predictor lists, each motion vector predictor associated with a reference picture. The apparatus comprises a selection module configured to select a reconstruction order for the motion vector predictor lists responsive to at least one characteristic of the candidate motion vector predictors, wherein the reconstruction order identifies one of the two different motion vector predictor lists as a first motion vector predictor list and the other of the two different motion vector predictor lists as a second motion vector predictor list. The apparatus comprises a reconstruction module configured to reconstruct a motion vector for each of the motion vector predictor lists according to the selected reconstruction order by first generating a first reconstructed motion vector using the at least one candidate motion vector predictor of the first motion vector predictor list, and subsequently generating a second reconstructed motion vector using the at least one candidate motion vector predictor of the second motion vector predictor list. The apparatus comprises a decoding module configured to decode the block of the current picture using the first and second reconstructed motion vectors.

In an embodiment, the candidate module determines the at least one candidate motion vector predictor for the second motion vector predictor list by determining the at least one candidate motion vector predictor using a motion vector derived from the first reconstructed motion vector before generating the second reconstructed motion vector.

In an embodiment, the candidate module determines the at least one candidate motion vector predictor using the motion vector derived from the first reconstructed motion vector by replacing one of the candidate motion vector predictors in the second motion vector predictor list with the motion vector derived from the first reconstructed motion vector before the reconstruction circuit generates the second reconstructed motion vector.

In an embodiment, the candidate module replaces one of the candidate motion vector predictors in the second motion vector predictor list by:
  determining whether one of the candidate motion vector predictors in the second motion vector predictor list was previously scaled by a scalar value; and
  if the second motion vector predictor list includes a previously scaled candidate motion vector predictor, replacing the previously scaled candidate motion vector predictor with the motion vector derived from the first reconstructed motion vector before generating the second reconstructed motion vector.

In an embodiment, the reconstruction module is further configured to receive a signal, from a video encoder, that the motion vector reconstruction order is swapped.

In an embodiment, the selection module selects the reconstruction order by:
  determining whether one of the motion vector predictor lists includes a template matching candidate motion vector predictor; and
  if one of motion vector predictor lists includes a template matching candidate motion vector predictor, selecting the reconstruction order by identifying the motion vector predictor list that includes the template matching candidate motion vector predictor as the first motion vector predictor list.

In an embodiment, the selection module selects the reconstruction order by:
  determining which of the motion vector predictor lists includes a candidate motion vector predictor that was previously scaled by a scalar value; and
  selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection module selects the reconstruction order by:
  determining whether one of the motion vector predictor lists includes a template matching candidate motion vector predictor;
  determining whether one of the motion vector predictor lists includes a candidate motion vector predictor that was previously scaled by a scalar value;
  if one of the motion vector predictor lists includes a template matching candidate motion vector predictor, selecting the reconstruction order by identifying the motion vector predictor list that includes the template matching candidate vector predictor as the first motion vector predictor list; and
  otherwise selecting the reconstruction order by identifying the motion vector predictor list that includes the candidate motion vector predictor that was previously scaled as the second motion vector predictor list, and identifying the remaining motion vector predictor list as the first motion vector predictor list.

In an embodiment, the selection module selects the reconstruction order by:
  determining a delta value for each of the candidate motion vector predictors relative to a corresponding actual motion vector; and
  selecting the reconstruction order by identifying the motion vector predictor list associated with the largest delta value as the first motion vector predictor list.

In an embodiment, the selection module selects the reconstruction order by:
  identifying which of the reference pictures associated with the selected candidate motion vector predictors of the two motion vector predictor lists is closest in display order to the current picture and define it as a first reference picture; and
  selecting the reconstruction order by identifying the motion vector predictor list associated with the first reference picture as the first motion vector predictor list.

In an embodiment, the candidate module is further configured to determine the at least one candidate motion vector predictor by determining at least one candidate motion vector predictor for each of three different motion vector predictor lists, each motion vector predictor list associated with a reference picture. In this embodiment, the selection module is configured to select the reconstruction order by selecting the reconstruction order for the three motion vector predictor lists responsive to the candidate motion vector predictors, wherein the reconstruction order identifies one of the three different motion vector predictor lists as the first motion vector predictor list, identifies a different one of the three different motion vector predictor lists as the second motion vector predictor list, and identifies the remaining one of the three different motion vector predictor lists as a third motion vector predictor list. In this embodiment, the reconstruction module is configured to reconstruct the motion vector for each of the motion vector predictor lists according to the selected reconstruction order further by, after generating the second reconstructed motion vector, generating a third reconstructed motion vector for the third motion vector predictor list using the at least one candidate motion vector predictor of the third motion vector predictor list. In this embodiment, the decoding module is configured to decode the block of the current picture by decoding the block of the current picture using the first, second, and third reconstructed motion vectors.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended embodiments are intended to be embraced therein.

The invention claimed is:

1. A method for predicting motion vectors used for bi-prediction in video encoding of a block of a current picture in a video encoder, the method comprising:
   determining at least one candidate motion vector predictor for each of two different motion vector predictor lists, each candidate motion vector predictor associated with a reference picture;
   selecting a reconstruction order for the two different motion vector predictor lists based on the candidate motion vector predictors, wherein the reconstruction order identifies one of the two different motion vector predictor lists as a first motion vector predictor list and the other of the two different motion vector predictor lists as a second motion vector predictor list;
   generating a first motion vector delta as a difference between a first actual motion vector for the block and a candidate motion vector predictor from the first motion vector predictor list;
   replacing one of the at least one candidate motion vector predictor in the second motion vector predictor list with the first actual motion vector or a scaled version of the first actual motion vector; and
   generating a second motion vector delta as a difference between a second actual motion vector for the block and a candidate motion vector predictor from the second motion vector predictor list.

2. The method of claim 1, wherein determining the at least one candidate motion vector predictor comprises determining the at least one candidate motion vector predictor at least partly based on an actual motion vector of a neighboring, previously encoded block in the current picture or a scaled version of the actual motion vector.

3. The method of claim 1, wherein generating the second motion vector delta comprises generating the second motion vector delta as a difference between the second actual motion vector and the candidate motion vector predictor equal to the first actual motion vector or the scaled version of the first actual motion vector.

4. The method of claim 1, further comprising scaling the first actual motion vector to obtain the scaled version of the first actual motion vector with a scalar value defined based on a distance in output order between the current picture and a reference picture associated with the first actual motion vector and a distance in output order between the current picture and a reference picture associated with the second actual motion vector.

5. The method of claim 1, wherein replacing one of the at least one candidate motion vector predictor comprises:
   determining whether any of the at least one candidate motion vector predictor in the second motion vector predictor list was previously scaled by a scalar value; and
   replacing the previously scaled candidate motion vector predictor with the first actual motion vector or the scaled version of the first actual motion vector if the second motion vector predictor list includes the previously scaled candidate motion vector predictor.

6. The method of claim 1, further comprising:
   encoding the block to form a bitstream comprising encoded representations of the first motion vector delta and the second motion vector delta; and
   including, in the bitstream, a syntax element defining the selected reconstruction order.

7. The method of claim 1, wherein selecting the reconstruction order comprises:
   generating a respective motion vector delta as a difference between an actual motion vector for the block and a respective candidate motion vector predictor; and
   selecting the reconstruction order by identifying a motion vector predictor list associated with the smallest motion vector delta value as the first motion vector predictor list.

8. A method for reconstructing motion vectors used for bi-prediction in video decoding of a block of a current picture in a video decoder, the method comprising:
   determining at least one candidate motion vector predictor for each of two different motion vector predictor lists, each candidate motion vector predictor associated with a reference picture;
   selecting a reconstruction order for the two different motion vector predictor lists based on the candidate motion vector predictors or based on a syntax element retrieved from a bitstream representing an encoded version of the current picture, wherein the reconstruction order identifies one of the two different motion vector predictor lists as a first motion vector predictor list and the other of the two different motion vector predictor lists as a second motion vector predictor list;
   generating a first reconstructed motion vector for the first motion vector predictor list using a candidate motion vector predictor of the first motion vector predictor list and a first motion vector delta retrieved from the bitstream;
   replacing one of the at least one candidate motion vector predictor in the second motion vector predictor list with the first reconstructed motion vector or a scaled version of the first reconstructed motion vector; and
   generating a second reconstructed motion vector for the second motion vector predictor list using a candidate motion vector predictor of the second motion vector predictor list and a second motion vector delta retrieved from the bitstream.

9. The method of claim 8, wherein determining the at least one candidate motion vector predictor comprises determining the at least one candidate motion vector predictor at least partly based on a reconstructed motion vector of a neighboring, previously decoded block in the current picture or a scaled version of the reconstructed motion vector.

10. The method of claim 8, wherein generating the second reconstructed motion vector comprises generating the second reconstructed motion vector using the candidate motion vector predictor of the second motion vector predictor list equal to the first reconstructed motion vector or the scaled version of the first reconstructed motion vector and the second motion vector delta.

11. The method of claim 8, further comprising scaling the first reconstructed motion vector to obtain the scaled version of the first reconstructed motion vector with a scalar value defined based on a distance in output order between the current picture and a reference picture associated with the first motion vector delta and a distance in output order between the current picture and a reference picture associated with the second motion vector delta.

12. The method of claim 8, wherein replacing one of the at least one candidate motion vector predictor comprises:
determining whether one of the at least one candidate motion vector predictor in the second motion vector predictor list was previously scaled by a scalar value; and
replacing the previously scaled candidate motion vector predictor with the first reconstructed motion vector or the scaled version of the first reconstructed motion vector if the second motion vector predictor list includes the previously scaled candidate motion vector predictor.

13. The method of claim 8, wherein selecting the reconstruction order comprises selecting the reconstruction order for the two different motion vector predictor lists based on the candidate motion vector predictors.

14. The method of claim 1, wherein selecting the reconstruction order comprises:
determining whether one of the two different motion vector predictor lists includes a template matching candidate motion vector predictor; and
if one of the two different motion vector predictor lists includes the template matching candidate motion vector predictor, selecting the reconstruction order by identifying a motion vector predictor list that includes the template matching candidate motion vector predictor as the first motion vector predictor list.

15. The method of claim 1, wherein selecting the reconstruction order comprises:
determining whether one of the two different motion vector predictor lists includes a candidate motion vector predictor that was previously scaled by a scalar value; and
selecting the reconstruction order by identifying a motion vector predictor list that includes the candidate motion vector predictor that was previously scaled as the second motion vector predictor list, and identifying the remaining motion vector predictor list as the first motion vector predictor list.

16. An apparatus for predicting motion vectors used for bi-prediction in video encoding of a block of a current picture in a video encoder, wherein the apparatus is configured to:
determine at least one candidate motion vector predictor for each of two different motion vector predictor lists, each candidate motion vector predictor associated with a reference picture;
select a reconstruction order for the two different motion vector predictor lists based on the candidate motion vector predictors, wherein the reconstruction order identifies one of the two different motion vector predictor lists as a first motion vector predictor list and the other of the two different motion vector predictor lists as a second motion vector predictor list;
generate a first motion vector delta as a difference between a first actual motion vector for the block and a candidate motion vector predictor from the first motion vector predictor list;
replace one of the at least one candidate motion vector predictor in the second motion vector predictor list with the first actual motion vector or a scaled version of the first actual motion vector; and
generate a second motion vector delta as a difference between a second actual motion vector for the block and a candidate motion vector predictor from the second motion vector predictor list.

17. A video encoder comprising the apparatus of claim 16, wherein the video encoder is configured to:
encode the block to form a bitstream comprising encoded representations of the first motion vector delta and the second motion vector delta, and
include, in the bitstream, a syntax element defining the selected reconstruction order.

18. An apparatus for reconstructing motion vectors used for bi-prediction in video decoding of a block of a current picture in a video decoder, wherein the apparatus is configured to:
determine at least one candidate motion vector predictor for each of two different motion vector predictor lists, each candidate motion vector predictor associated with a reference picture;
select a reconstruction order for the two different motion vector predictor lists based on the candidate motion vector predictors or based on a syntax element retrieved from a bitstream representing an encoded version of the current picture, wherein the reconstruction order identifies one of the two different motion vector predictor lists as a first motion vector predictor list and the other of the two different motion vector predictor lists as a second motion vector predictor list;
generate a first reconstructed motion vector for the first motion vector predictor list using a candidate motion vector predictor of the first motion vector predictor list and a first motion vector delta retrieved from the bitstream;
replace one of the at least one candidate motion vector predictor in the second motion vector predictor list with the first reconstructed motion vector or a scaled version of the first reconstructed motion vector; and
generate a second reconstructed motion vector for the second motion vector predictor list using a candidate motion vector predictor of the second motion vector predictor list and a second motion vector delta retrieved from the bitstream.

19. A video decoder comprising the apparatus of claim 18.

20. A user equipment comprising the video encoder of claim 17.

* * * * *